(12) United States Patent
Collins

(10) Patent No.: US 11,072,451 B2
(45) Date of Patent: Jul. 27, 2021

(54) CONTAINERS WITH CHANNELS

(71) Applicant: David M. Collins, Portland, OR (US)

(72) Inventor: David M. Collins, Portland, OR (US)

(*) Notice: Subject to any disclaimer, the term of this patent is extended or adjusted under 35 U.S.C. 154(b) by 235 days.

(21) Appl. No.: 16/201,940

(22) Filed: Nov. 27, 2018

(65) Prior Publication Data

US 2019/0161231 A1    May 30, 2019

Related U.S. Application Data

(60) Provisional application No. 62/591,692, filed on Nov. 28, 2017.

(51) Int. Cl.
| | | |
|---|---|---|
| *A47G 19/02* | (2006.01) | |
| *B65D 1/40* | (2006.01) | |
| *B65D 1/34* | (2006.01) | |
| *A47J 43/28* | (2006.01) | |
| *B65D 25/28* | (2006.01) | |
| *B65D 1/22* | (2006.01) | |

(52) U.S. Cl.
CPC .............. *B65D 1/40* (2013.01); *A47J 43/281* (2013.01); *B65D 1/22* (2013.01); *B65D 1/34* (2013.01); *B65D 25/2885* (2013.01); *B65D 2231/005* (2013.01)

(58) Field of Classification Search
CPC ... B65D 1/40; B65D 1/22; B65D 1/34; B65D 25/2885; A47J 43/281; A47G 19/06; A47G 19/02; A47G 19/30; A47G 2019/306
USPC ............................................... 220/608, 574.1
See application file for complete search history.

(56) References Cited

U.S. PATENT DOCUMENTS

| | | |
|---|---|---|
| 680,648 A | 8/1901 | Crandall |
| 2,170,040 A | 8/1939 | Stuart |
| 3,656,525 A | 4/1972 | Goodart |
| 3,782,582 A * | 1/1974 | Lybbert .................. B65D 1/36 220/23.6 |
| D245,384 S * | 8/1977 | Ashton ....................... D7/624.1 |
| 4,588,086 A | 5/1986 | Coe |
| 5,328,051 A | 7/1994 | Potter et al. |
| 5,638,981 A | 6/1997 | Crane et al. |
| 6,604,714 B1 * | 8/2003 | Hall ..................... A47F 7/0035 206/232 |
| D577,951 S | 10/2008 | Courington et al. |

(Continued)

FOREIGN PATENT DOCUMENTS

| | | |
|---|---|---|
| CN | 201847311 U | 6/2011 |
| CN | 202173147 U | 3/2012 |

(Continued)

OTHER PUBLICATIONS

Amazon.com, "Copper Ice Cream Spoon (Round, Silver)" [online], Nov. 27, 2017 (Nov. 27, 2017), (retrieved from the internet on Jan. 28, 2019); <URL https://www.amazon.com/Copper-ice-cream-spoon-silver/dp/B00GOINQNU>.

(Continued)

*Primary Examiner* — King M Chu
(74) *Attorney, Agent, or Firm* — Klarquist Sparkman, LLP

(57) ABSTRACT

Containers can include main bodies of various shapes and include one or more recessed channels that extends from one side to another of the container to provide greater ease of use and improved access to materials contained there, such as food and other solids, liquids, or combinations thereof.

20 Claims, 26 Drawing Sheets

(56) References Cited

U.S. PATENT DOCUMENTS

| | | | | |
|---|---|---|---|---|
| D665,228 S | * | 8/2012 | Rosen | D7/562 |
| 8,695,838 B1 | * | 4/2014 | Montgomery | A47G 21/145 220/574.1 |
| 8,857,802 B1 | * | 10/2014 | Geier | B26D 3/24 269/9 |
| 9,027,777 B1 | | 5/2015 | Steidinger, III | |
| 9,345,348 B2 | | 5/2016 | Seiler et al. | |
| D760,556 S | * | 7/2016 | Wiggins | D7/691 |
| 2009/0250474 A1 | * | 10/2009 | Malcolm | A47G 19/02 220/574.1 |
| 2009/0321455 A1 | * | 12/2009 | Fernandez | A47G 19/025 220/574 |
| 2016/0022064 A1 | * | 1/2016 | Gonterman | A47G 19/02 220/574.1 |

FOREIGN PATENT DOCUMENTS

| | | |
|---|---|---|
| CN | 202553237 U | 11/2012 |
| CN | 103371681 | 10/2013 |
| CN | 203841450 U | 9/2014 |
| DE | 336423 | 5/1921 |
| DE | 202012103680 U1 | 10/2012 |
| GB | 191102043 A | 6/1911 |
| JP | 3168528 U | 6/2011 |
| WO | WO 2008/145956 A1 | 12/2008 |

OTHER PUBLICATIONS

HomeMade-NYC.com, "Milky Bowl—Dimples" [online], Oct. 1, 2015 (Oct. 1, 2015), (retrieved from the internet on Jan. 28, 2019); <URL https://www.homemade-nyc.com/products/milky-bowl-dimples>.

Instagram.com, "Nom Living" [online], Jun. 16, 2017 (Jun. 16, 2017), (retrieved from the internet on Jan. 28, 2019); <URL https://instagram.com/p/BVaEF1_gbX/>.

International Search Report and Written Opinion, dated Feb. 5, 2019, of PCT Application No. PCT/US2018/062838, 10 pages.

Kickstarter.com, "Channel Bowl—Crafted for Better Scooping, Sipping & Gripping" [online], Dec. 13, 2017 (Dec. 13, 2017), (retrieved from the internet on Jan. 21, 2019); <URL https://www.kickstarter.com/projects/channelbowl/channel-bowl-crafted-for-better-scooping-sipping-a/description>.

* cited by examiner

CONTAINERS WITH CHANNELS

CROSS REFERENCE TO RELATED APPLICATION

This application claims the benefit of U.S. Provisional Patent Application No. 62/591,692, filed Nov. 28, 2017, which is incorporated by reference herein in its entirety.

FIELD

This application relates to container systems and, in particular, to containers that are capable of holding food, liquids, and other materials.

SUMMARY

Various containers are disclosed that include channels for providing greater access to materials held by the container. In some embodiments, a container comprises a main body and a recessed channel extending along an interior surface of the main body.

In some embodiments, the channel can extend from an upper portion of one side of the main body, through the center of the main body to an upper portion of an opposite side of the main body. The width of the channel can be less than one third of the width of the main body, or in some cases, less than one fourth or one sixth of the width of the main body.

Container systems can include a container with a channel and a spoon providing access to the channel. In some cases, the width of the channel can be substantially equal to the width of a spoon head. In other cases, the width of the channel can be less than the width of a spoon head or at least a portion of the spoon head.

DETAILED DESCRIPTION

As used herein, the term "container" means any structure with a volume suitable for retaining foodstuffs (e.g., solids, liquids, or combinations thereof) and other materials (e.g., non-foodstuffs including solids, liquids, or combinations thereof) for which improved access to remaining portions in the container would be desirable.

Food, foodstuffs, and like are one type of material that can be held, stored, or delivered from the containers disclosed herein. Other materials, of course, can be held, stored, or delivered in the containers disclosed herein. Thus, although the discussion herein generally refers to food items, it should be understood that for each use of the terms food, foodstuffs, and the like, an alternative embodiment is a container that holds, stores, or delivers non-food materials. Similarly, references to spoons, silverware, and utensils are not intended to be limiting since other tools can be paired with the container systems disclosed herein that may not be considered spoons, silverware, or utensils, either because of their shapes or because they are not intended for use with non-food materials. For example, the accessory tool may be a flat tool that matches the shape of the channel, thereby allowing one to push or pull materials out of the channel by fitting a "head" area of the tool into the channel and sliding it along at least some of the length of the channel.

As used herein, the term "channel" means an elongated groove, or series of groves that collectively act together, that have a depth relative to an adjacent surface and is significantly longer than it is wide.

Figure 1:
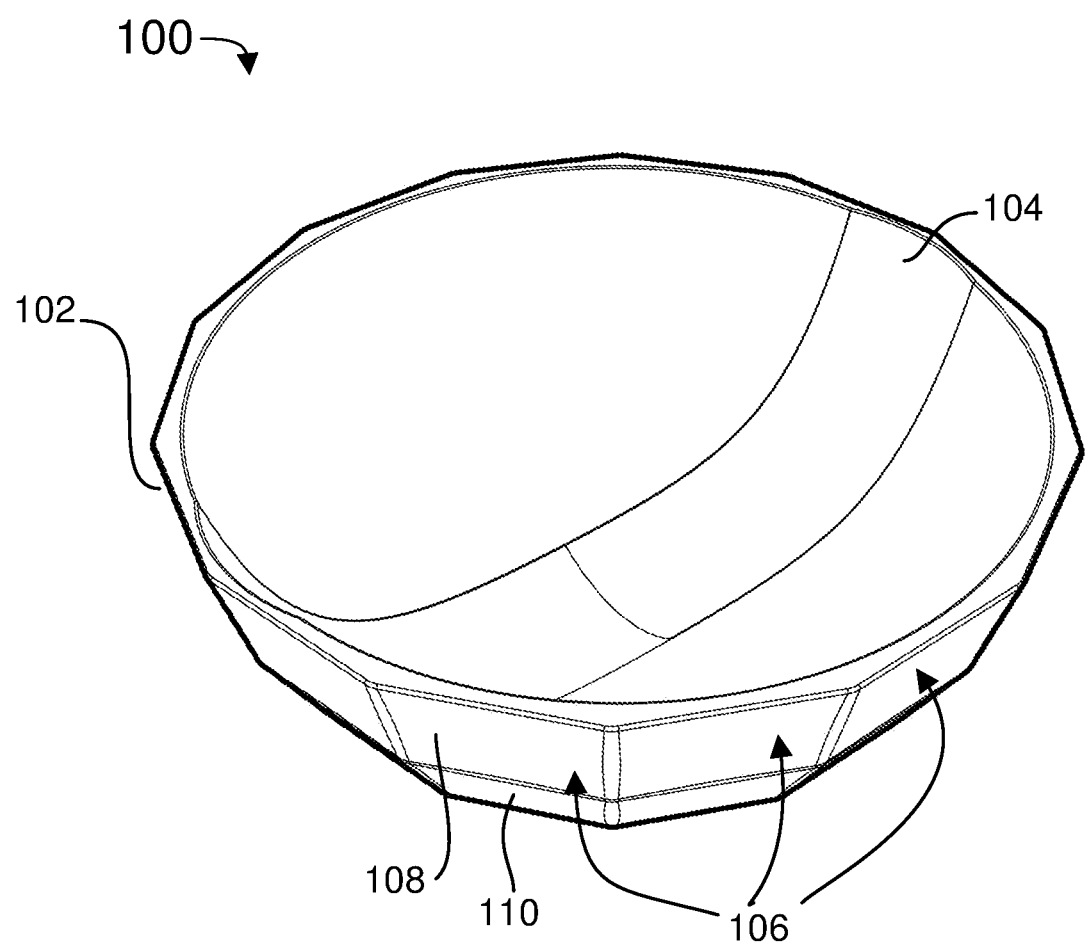
FIGS. 1-2 show perspective views of an embodiment of a container with a channel according to the teachings disclosed herein.
Figure 2:
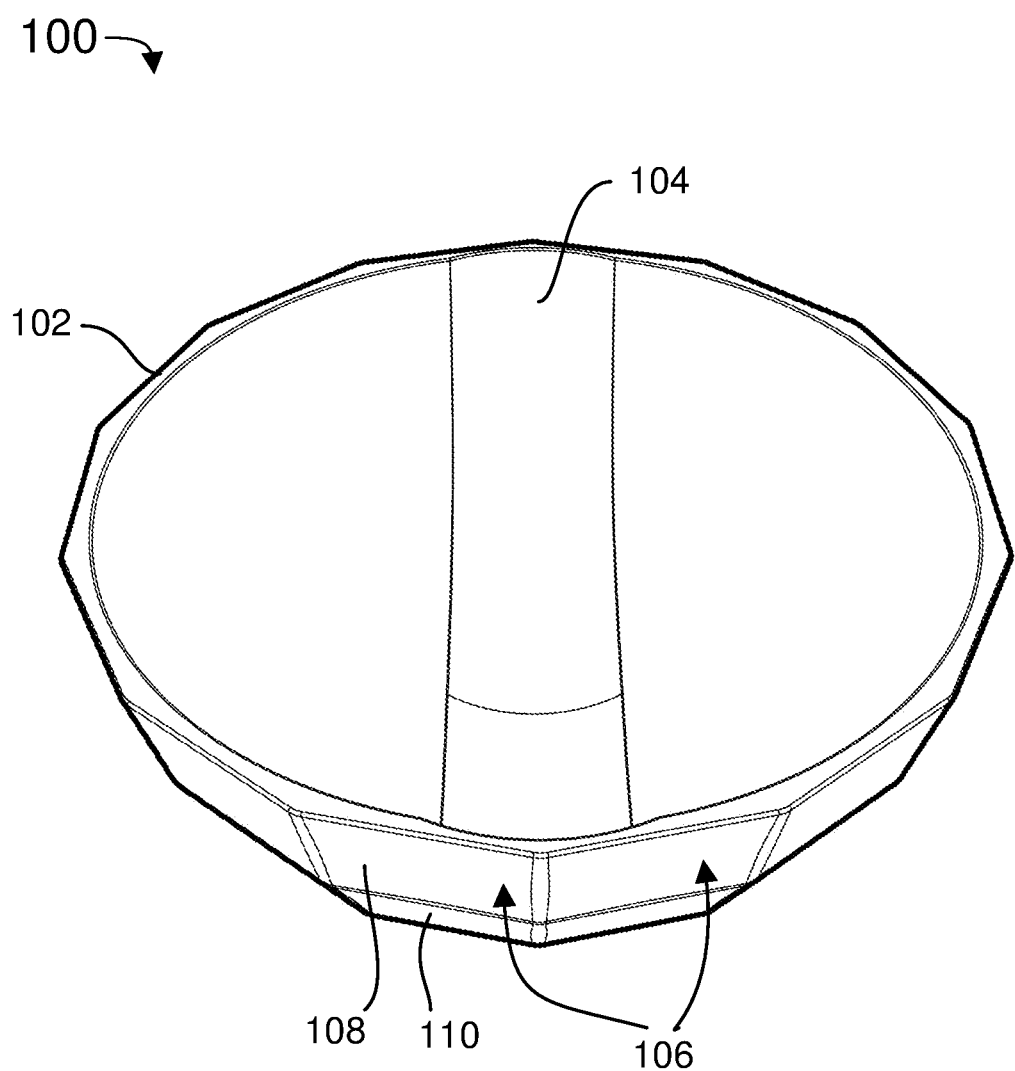

FIGS. 1 and 2 show perspective views at different angles of an embodiment of a container that includes a channel. In this embodiment, the container is a bowl. The bowl 100 comprises a main body 102 and a channel or recessed portion 104. The channel 104 can extend along an interior surface of the main body 102 from the top of one side of the main body to the top of an opposite side of the main body, passing through the bottom and the center of the main body. In the embodiment illustrated in FIG. 1, the channel extends all the way to the edge of the opening of the bowl on both sides. However, in some embodiments, the channel extend all the way to the opening (i.e., the top of the main body of the bowl). Instead the channel may only extend partly up an interior sidewall on one or both sides.

The channel 104 comprises a groove that is recessed within the main body 102 such that solid or liquid food can collect within the groove. In some embodiments, the channel is at least 3 times longer than it is wide, in other embodiments, at least 5 times longer than it is wide. Furthermore, the curved shape of the interior of the main body 102 can help funnel foodstuffs into the channel 104.

In traditional bowls without such a groove, it can be difficult to corral the last few bits of food (e.g., solids, liquids, or combinations thereof) out of the bowl with silverware. However, with the bowl disclosed herein, a spoon can nestle into the channel and easily scoop out any remnants of food in the bowl. Furthermore, with liquid food such as soups, when there is a small amount of the liquid remaining in the bowl 100 it will collect in the channel 104. As such, the bowl 100 can be tilted such that this remaining liquid can be poured from the channel 104 such that a person can easily drink the liquid, which will be contained within the channel. If the bowl is formed with a channel that extends upwards on only one side, that side can be the side that provides pourability of the liquid or foodstuffs in this bowl in this manner.

In the illustrated example, the outer surface of the main body 102 comprises a plurality of segmented sections 106 extending around the perimeter of the main body. Alternatively, the main body 102 can be dome-shaped or have another shape without multiple sections 106. As discussed in more detail below, food containers have one or more channels (with or without the corresponding spoons disclosed herein) can take a variety of other shapes.

In the illustrated example, each section 106 comprises an upper polygonal portion 108 and a lower polygonal portion 110. The upper polygonal portion can be angled more inward than the lower polygonal portion 108. That is, the angle between the lower polygonal portion 110 and a central axis of the main body 102 can be greater than the angle between the upper polygonal portion 108 and the central axis of the main body. This can create natural resting or gripping places for a person to place their fingers to hold the bowl 100. In some examples, the sections 106 can comprise additional polygonal portions beyond the upper and lower portions 108, 110. In the illustrated example, there are 14 sections 106 extending around the perimeter of the main body 102. In other examples, there can be greater or fewer than 14 sections 106. In some examples, the sections 106 can have a dimpled surface such that the bowl 100 is easier to hold.

Figure 3:
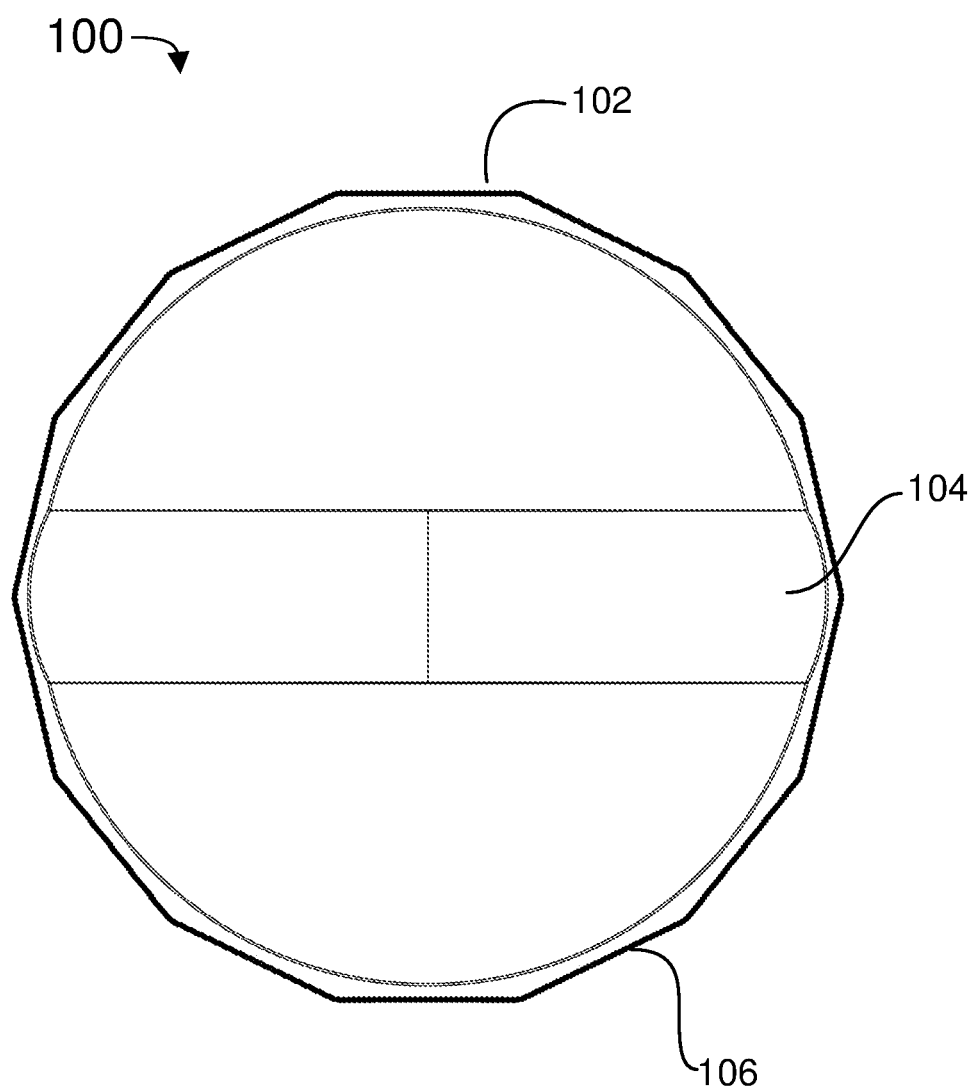
FIG. 3 shows an overhead view of an embodiment of a container with a channel.

FIG. 3 shows an overhead view of the bowl 100. In the illustrated example, the channel 104 is approximately ⅕ of the width of the main body 102 of the bowl 100. In other examples, the channel 104 can have a width that is greater than or less than ⅕ of the width of the main body 102. In some embodiments, the width of the channel 104 can be large enough that a spoon can fit within the channel to retrieve food from the channel. The relationship between the bowl 100 and various spoons is discussed in more detail below.

Figure 7:
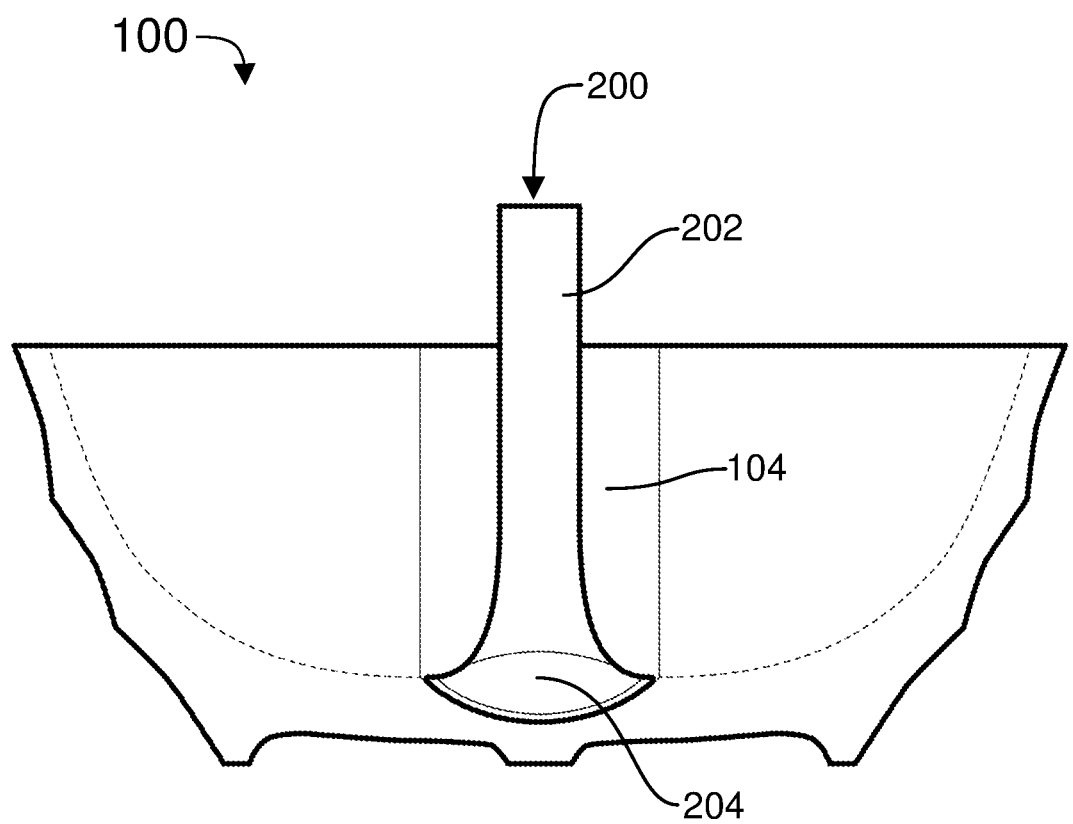
FIG. 7 shows a cross sectional view of an embodiment of a container system including a channel and a spoon.

The channel 104 has a depth relative to adjacent surfaces of the bottom of the bowl 100. The depth can be the same across the width of the channel or it can vary as shown in FIG. 7 (e.g., based on a curvature or other non-curved change in depth). In some embodiments, a maximum depth (which is the same as the depth for a channel with a non-varying depth) can correspond to a depth of a related tool designed for use with the system (e.g., the spoon shown in FIG. 7).

In some cases, the maximum depth can be less than two inches, less than 1 inch, or between 0.3 inches and 1.5 inches. In another case, the maximum depth can be dependent upon an internal height of the container (measured within the usable space of the container). Thus, for example, the maximum depth can be between ⅕ and 1/20 the internal height of the container, or between ⅕ and 1/15, or between ½ and 1/12 of the internal height of the container.

Figure 4:
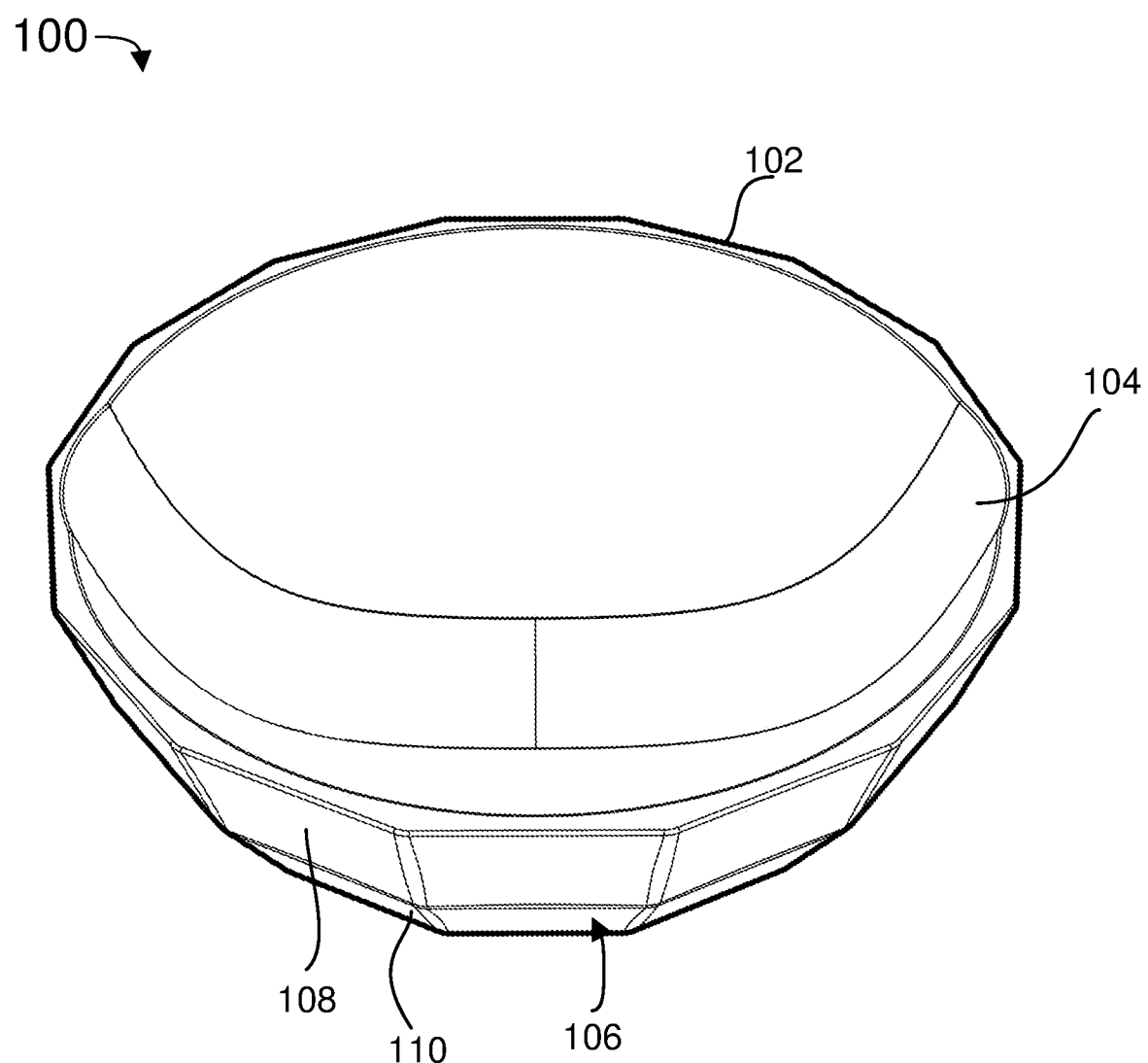
FIG. 4 shows a perspective view of an embodiment of a container with a channel.
Figure 5:
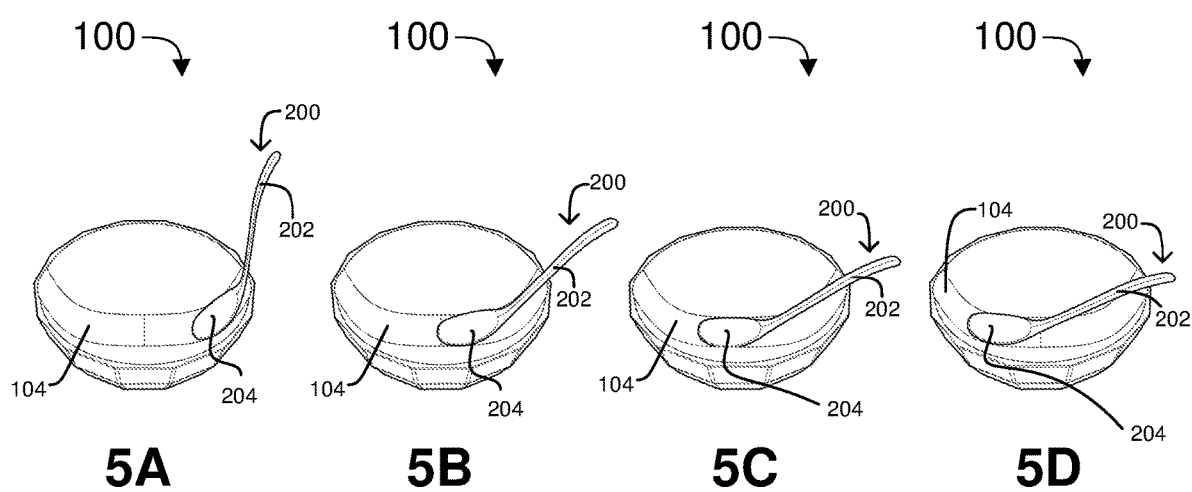
FIGS. 5A-5D show perspective views of an embodiment of a container system including a channel and a spoon.

FIG. 4 shows a perspective view of the bowl 100 while FIGS. 5A-5D show the same perspective view of the bowl 100 along with a spoon 200. In the illustrated example of FIGS. 5A-5D, the spoon 200 comprises a handle 202 for gripping the spoon and a spoon head 204 for holding food. The spoon head 204 can have a width approximately equal to or slightly less than the width of the channel 104. This can allow the spoon head 204 to fit within the channel 104 and capture food remnants therein. FIGS. 5A-5D show a progression of the spoon 200 sliding along the channel 104.

Figure 6:
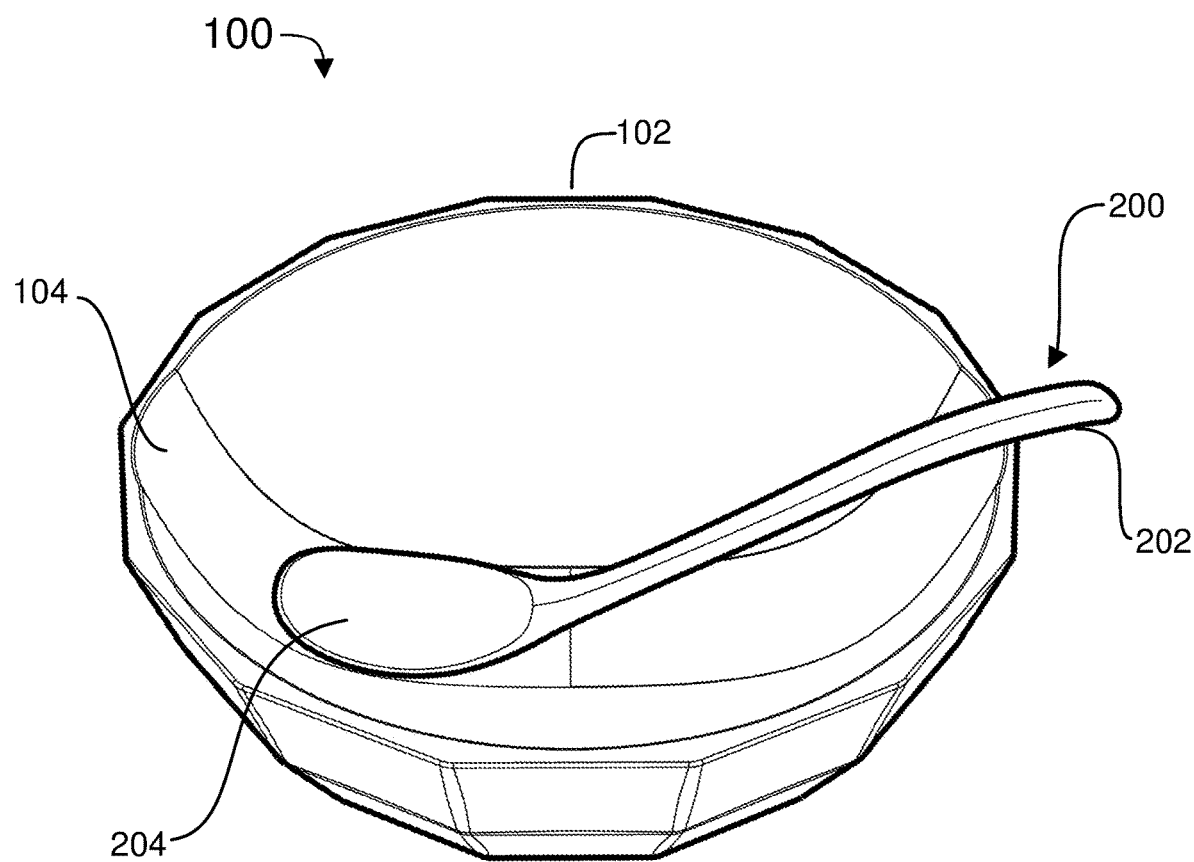
FIG. 6 shows a perspective view of an embodiment of a container system including a channel and a spoon.

FIG. 6 shows the spoon resting inside the bowl 100. The handle 202 of the spoon 200 can have an arched surface such that the handle can rest on the edge of the main body 102 while the spoon head rests in the channel 104. The spoon 200 can have a length such that the spoon cannot fit completely within the main body 102 of the bowl 100. This can prevent the spoon 200 from falling in a bowl full of soup and becoming difficult to retrieve since at least a portion of the handle 202, in the embodiment, extends outside the width of the main body when the spoon is in the bowl.

FIG. 7 shows a cross sectional view of the bowl 100 and the spoon 200. The spoon head 204 can have a concave shape such that the spoon head fits within the recessed channel 104 and can easily retrieve food therefrom. The contour of the spoon head 204 can match the contour of the groove in the channel 104.

Figure 8:
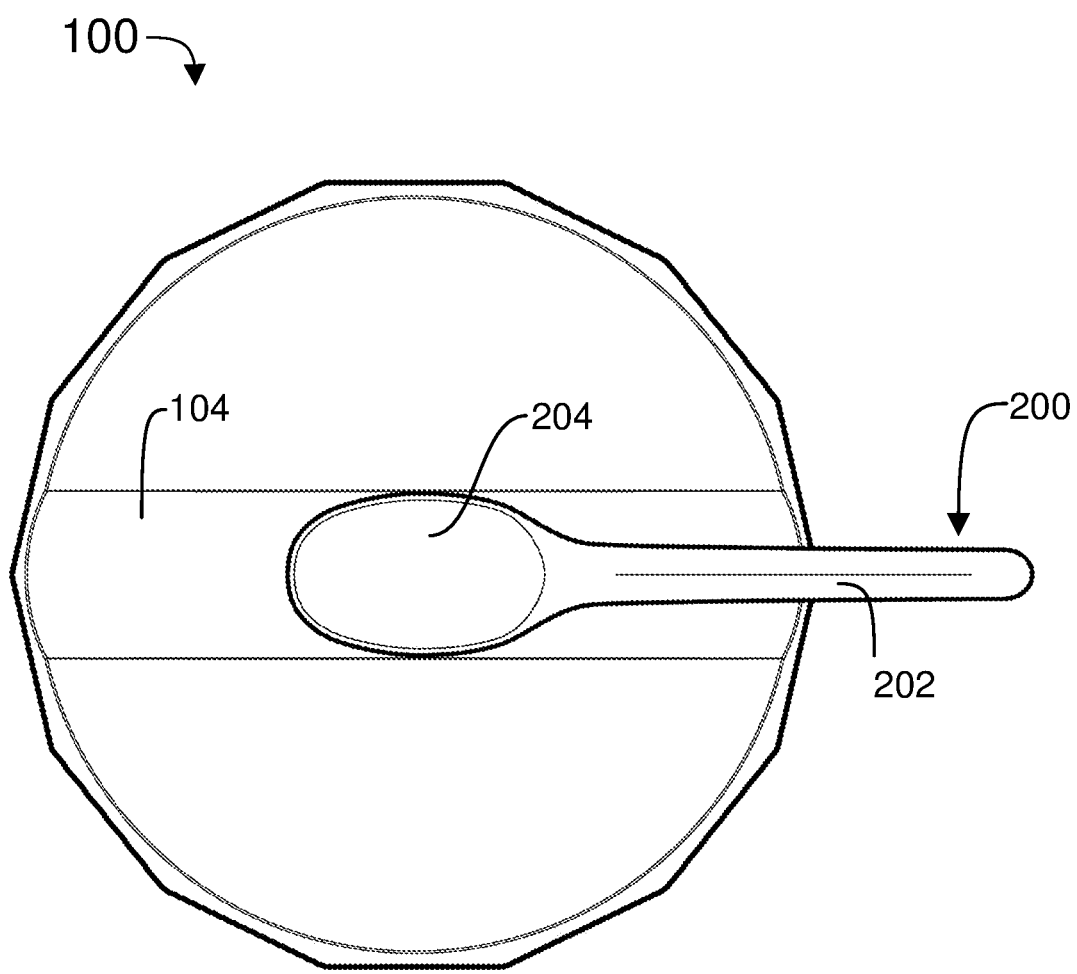
FIGS. 8-11 show overhead views of various embodiments of a container system including a channel and a spoon.
Figure 9:
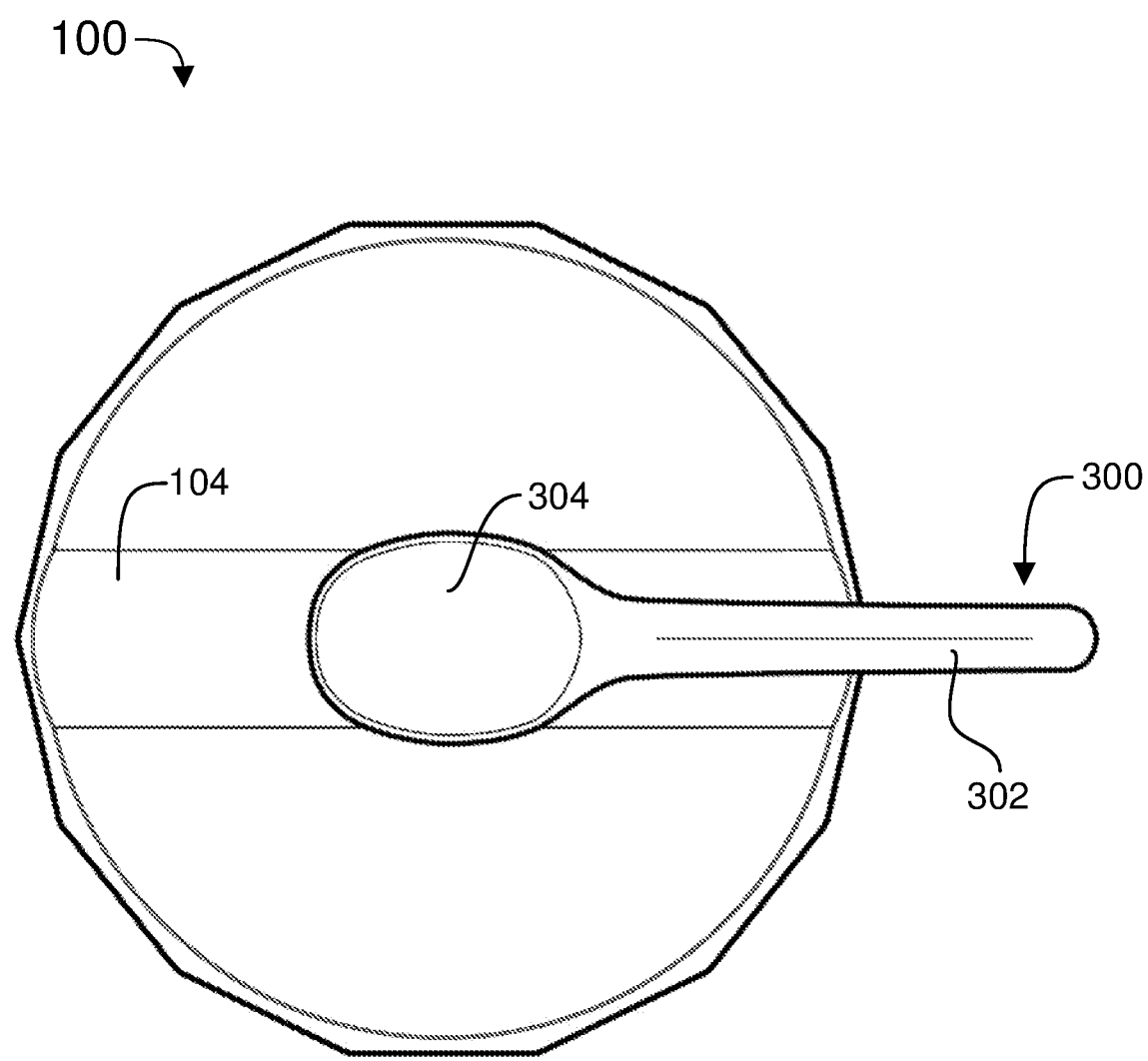

FIG. 8 shows an overhead view of the bowl 100 and the spoon 200 showing that the width of the spoon head 204 is about the same as the width of the channel 104. FIG. 9 shows an overhead view of the bowl 100 and another example spoon 300 comprising a handle 302 and a spoon head 304. In the example of FIG. 9, the width of the spoon head 304 is larger than the width of the channel 104.

Figure 10:
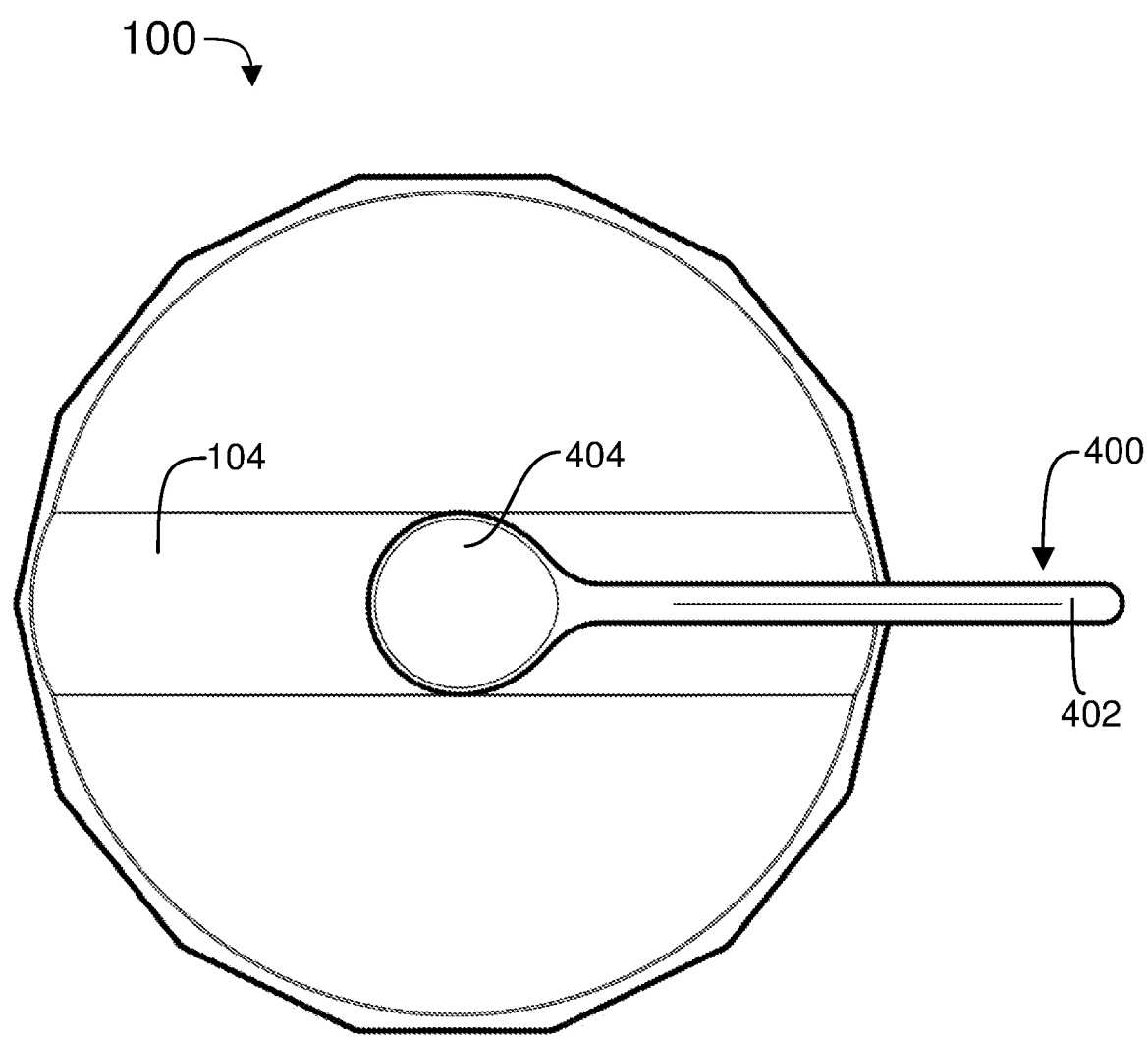
Figure 11:
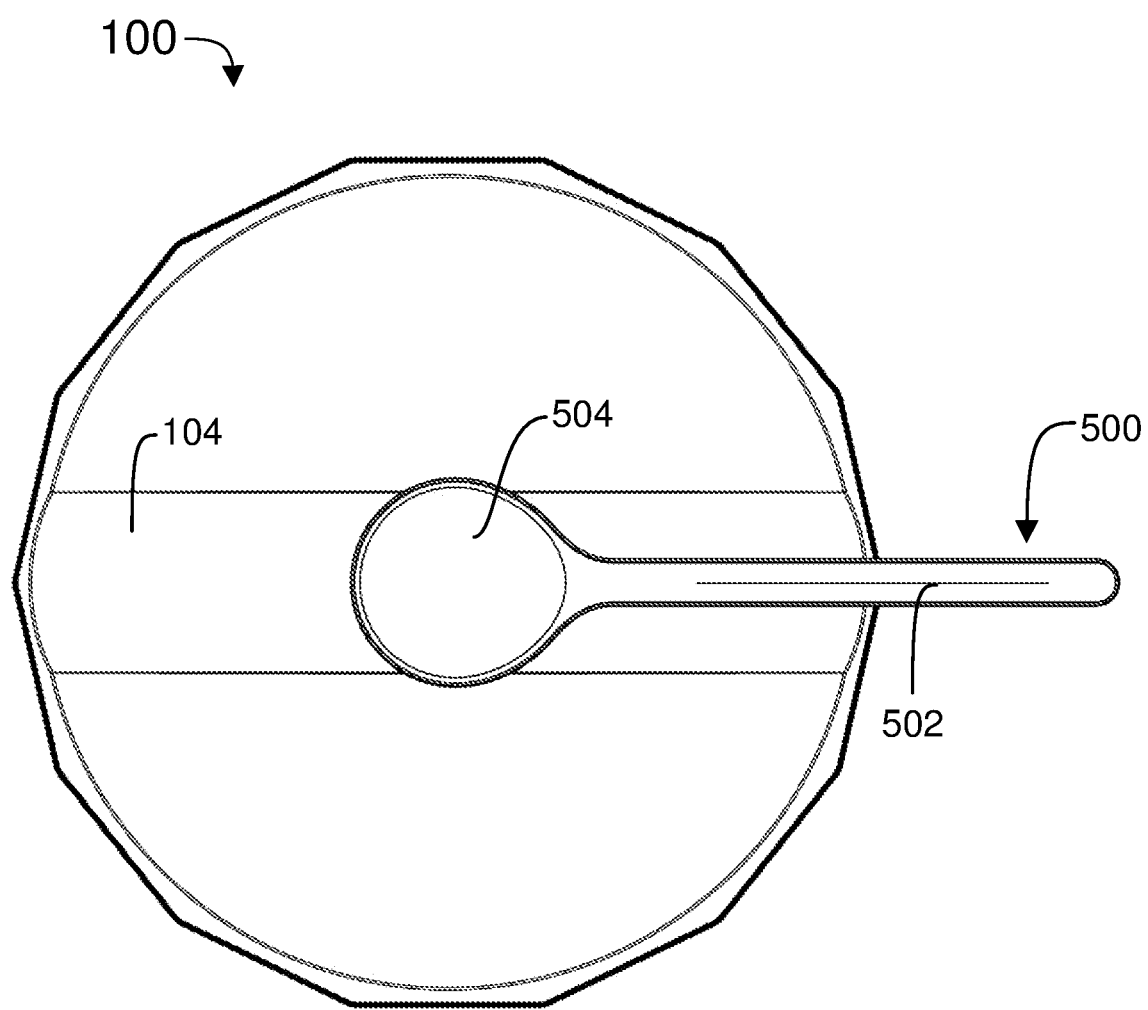

FIG. 10 shows an overhead view of the bowl 100 and another example spoon 400 comprising handle 402 and spoon head 404. In the example of FIG. 10, the spoon head 404 is substantially circular and the width of the spoon head is about the same as the width of the channel 104. FIG. 11 shows an overhead view of the bowl 100 and another example spoon 500 comprising a handle 502 and a spoon head 502. In the example of FIG. 11, the spoon head 504 is substantially circular and the width of the spoon head is greater than the width of the channel 504.

Figure 12:
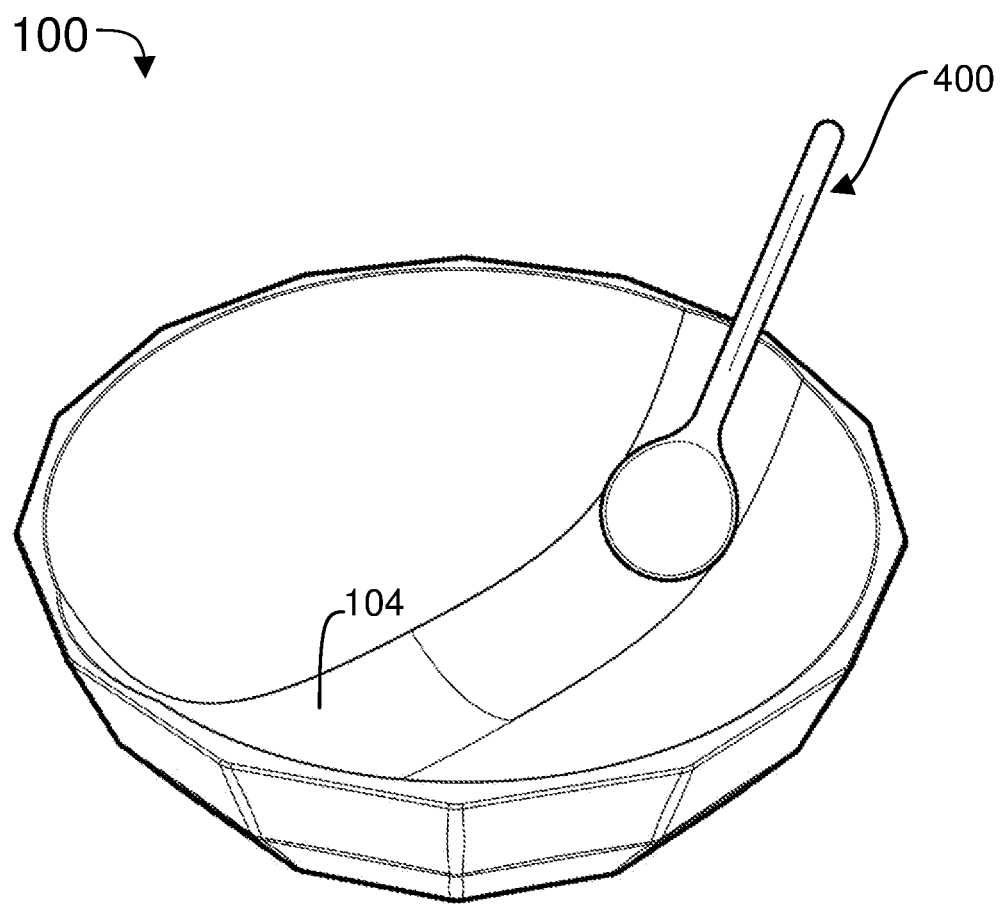
FIGS. 12-13 show perspective views of an embodiment of a container system including a channel and a spoon.
Figure 13:
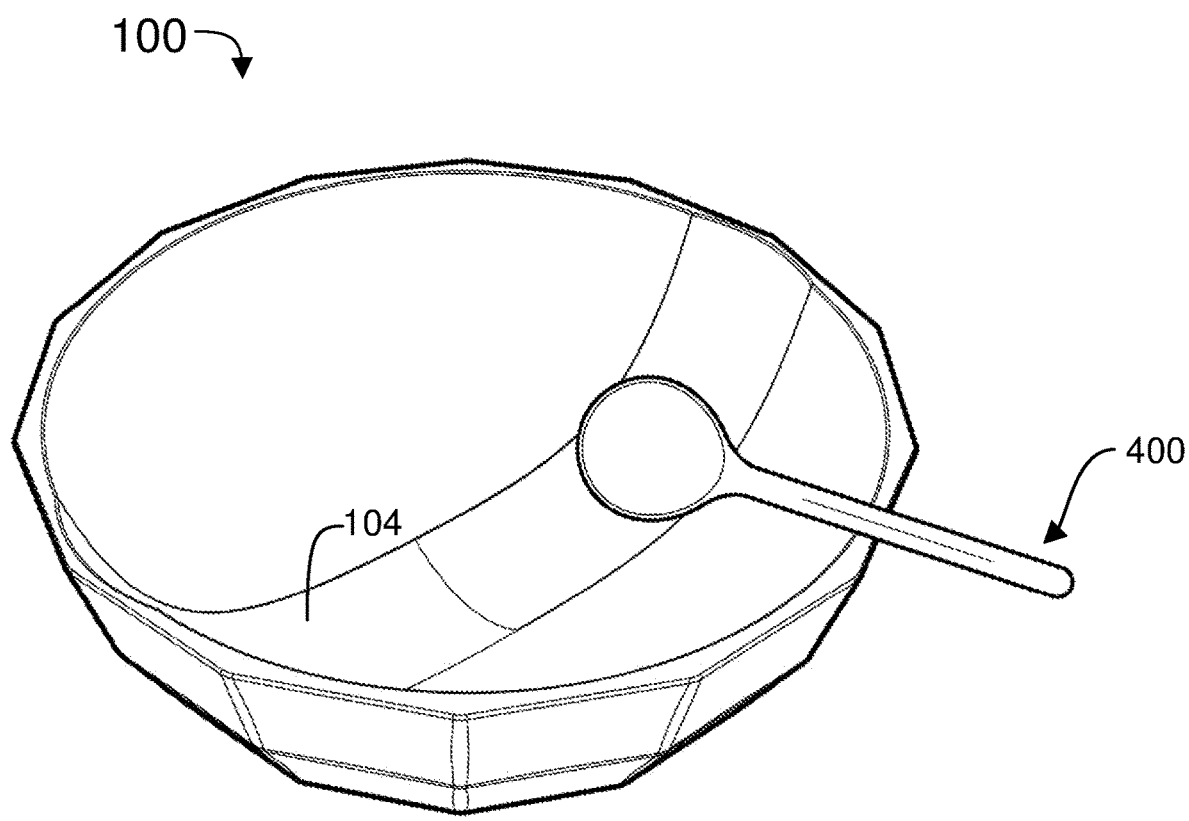

FIG. 12 shows the bowl 100 and the spoon 400 within the channel 104 with the spoon being parallel to the channel 104. This is one way the spoon 400 can be oriented with respect to the bowl 100 in order to scoop food out of the channel 104. FIG. 13 shows the bowl 100 and the spoon 400 within the channel 104 with the spoon at a different angle than parallel with respect to the channel. This is another way that the spoon 400 can be oriented with respect to the bowl 100 in order to scoop food out of the channel 104.

Figure 14:
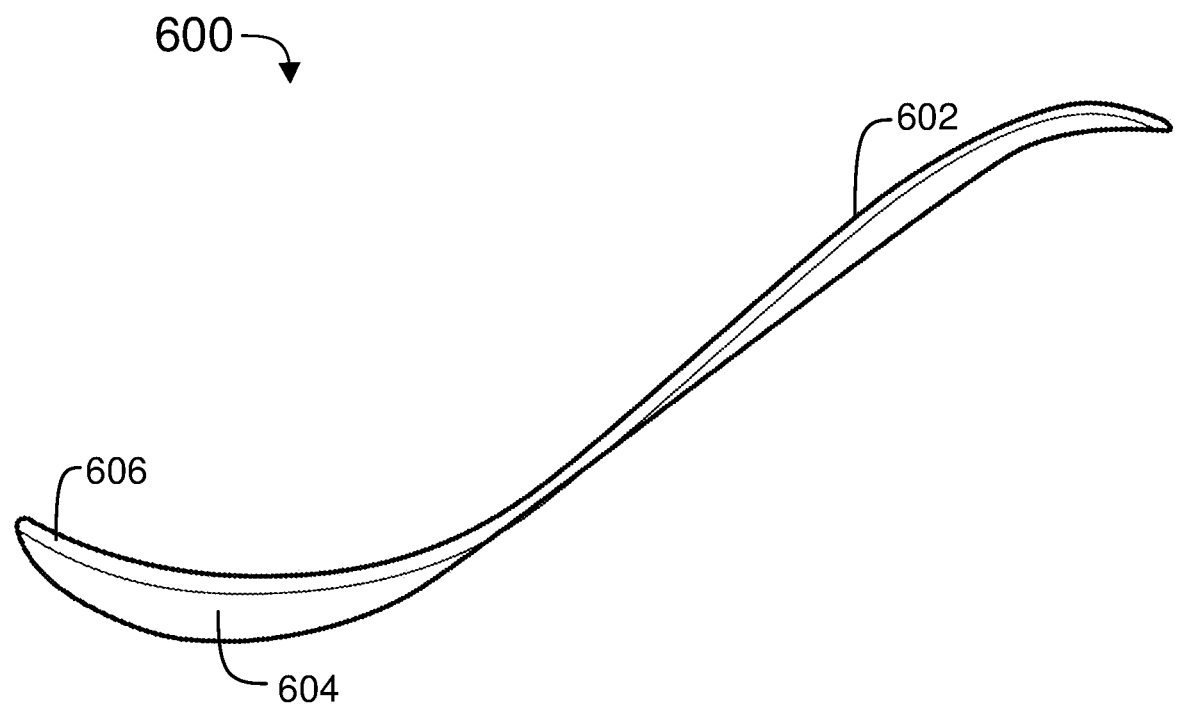
FIG. 14 shows a side view of an embodiment of a spoon that can be used with containers disclosed herein.
Figure 15:
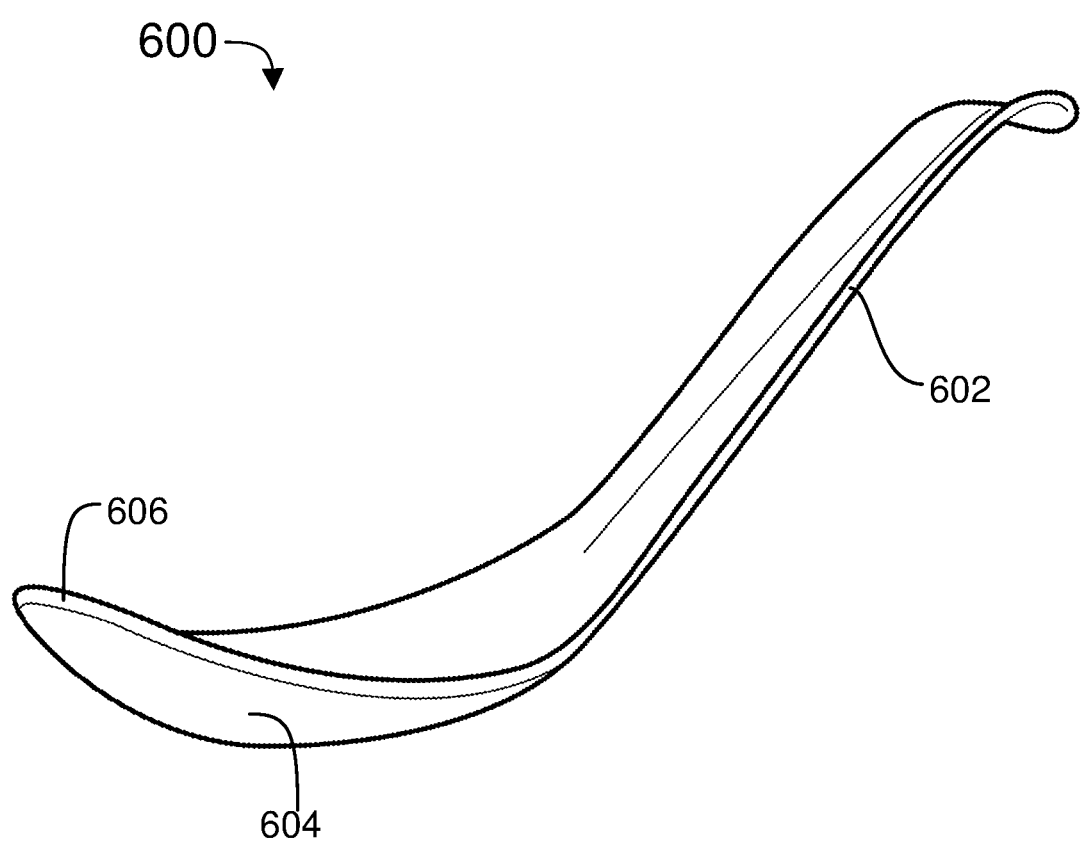
FIG. 15 shows a perspective view of an embodiment of a spoon that can be used with containers disclosed herein.

FIG. 14 shows a side view of an example spoon 600 comprising a handle 602 and a spoon head 604. In the example of FIG. 14, the spoon head 604 has an expanded, curved front lip 606. This curved front lip 606 can aid in scooping food from the channel 104 of the bowl 100. FIG. 15 shows a perspective view of the spoon 600.

Figure 16:
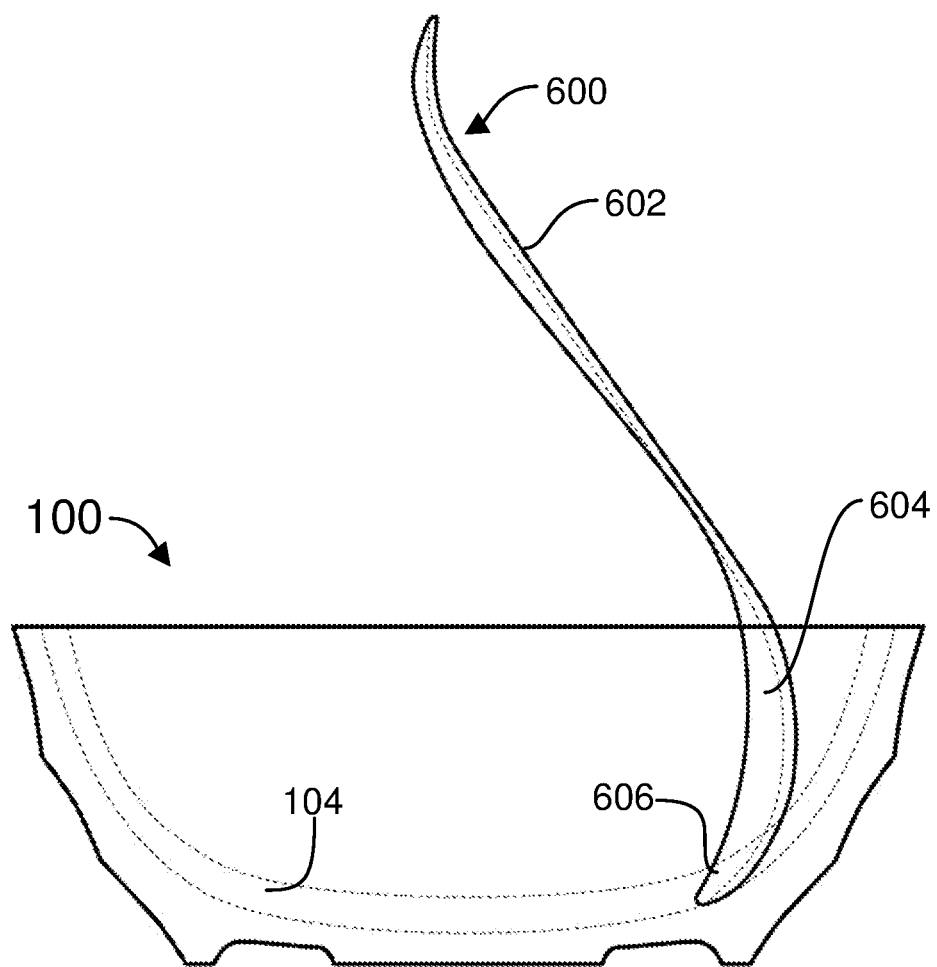
FIGS. 16-18 show cross sectional views of an embodiment of a container system including a channel and a spoon.
Figure 17:
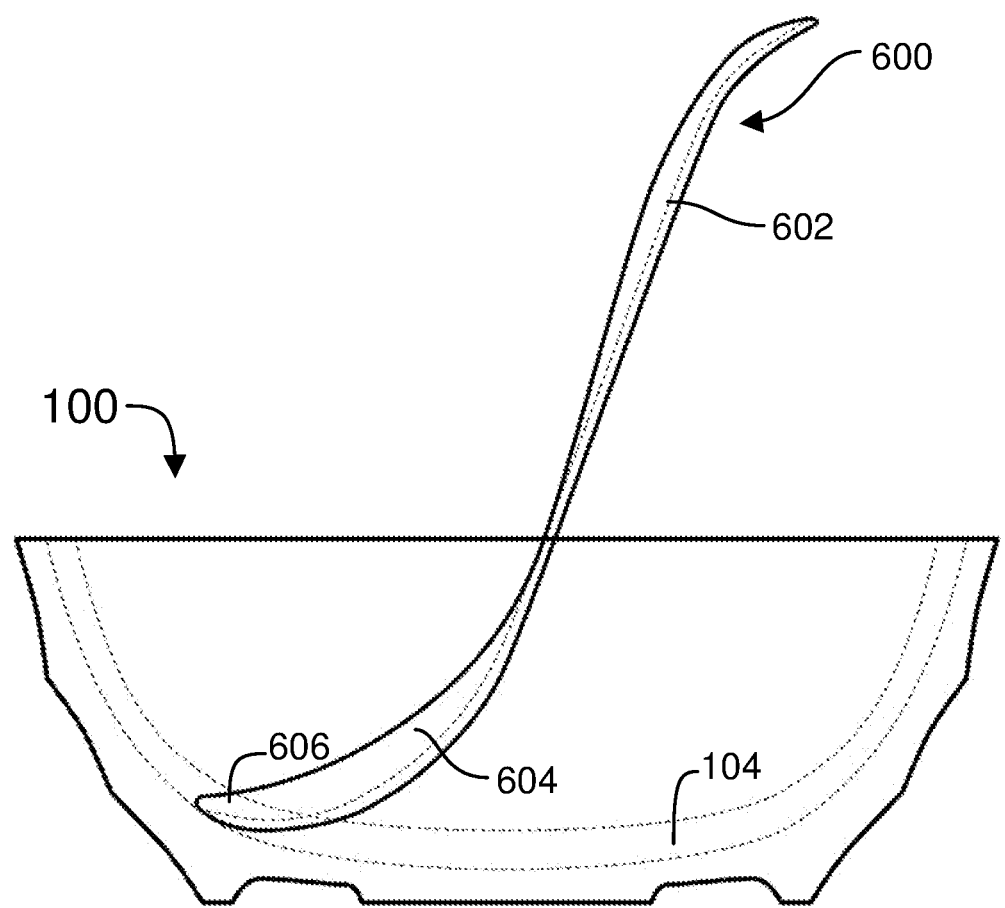
Figure 18:
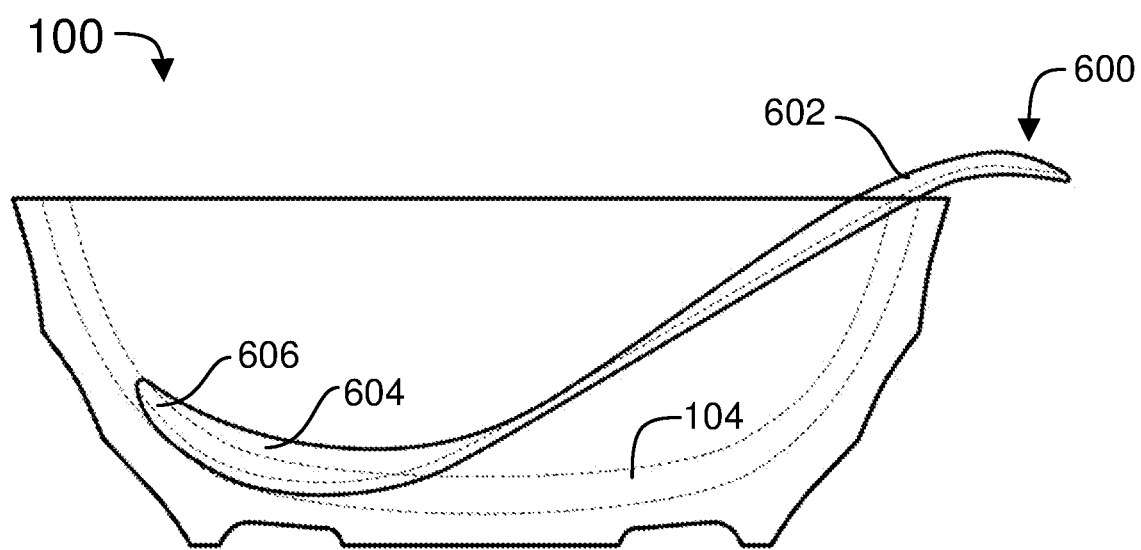

FIGS. 16-18 shows cross sectional views of the bowl 100 and the example spoon 600. As can be seen in FIG. 16, the spoon 600 can be placed into the bowl 100 with the front lip 606 against the channel 104. The spoon 600 can then be moved along the channel 104 with the front lip 606 against the channel as shown in FIG. 17 to capture food in the channel. As the front lip 606 of the spoon 600 continues to move along the channel 104, eventually the spoon head can rest against the channel as shown in FIG. 18 holding the food that was scooped up along the way.

FIGS. 1-18 illustrate bowls with openings that are generally circular and interior volumes that are generally concave. However, one or more channels (and other features discussed above) can be provided with containers that have different shapes.

Figure 19:
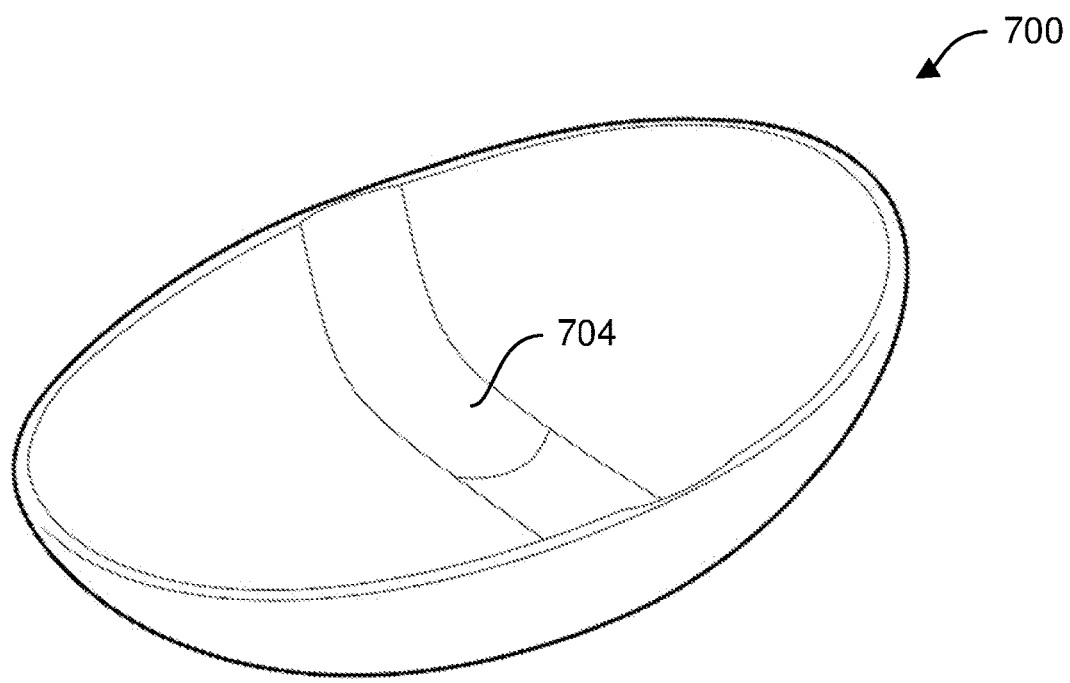
FIGS. 19-21 illustrates embodiments of oval-shaped containers
Figure 20:
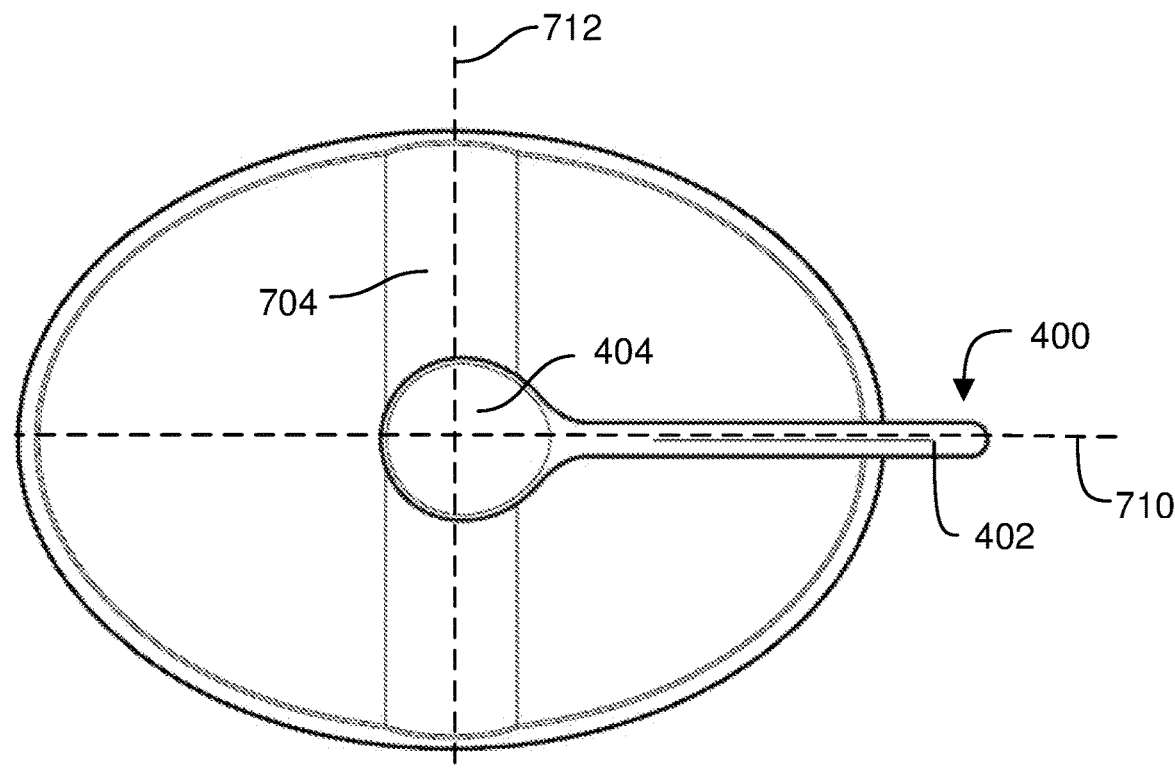
Figure 21:
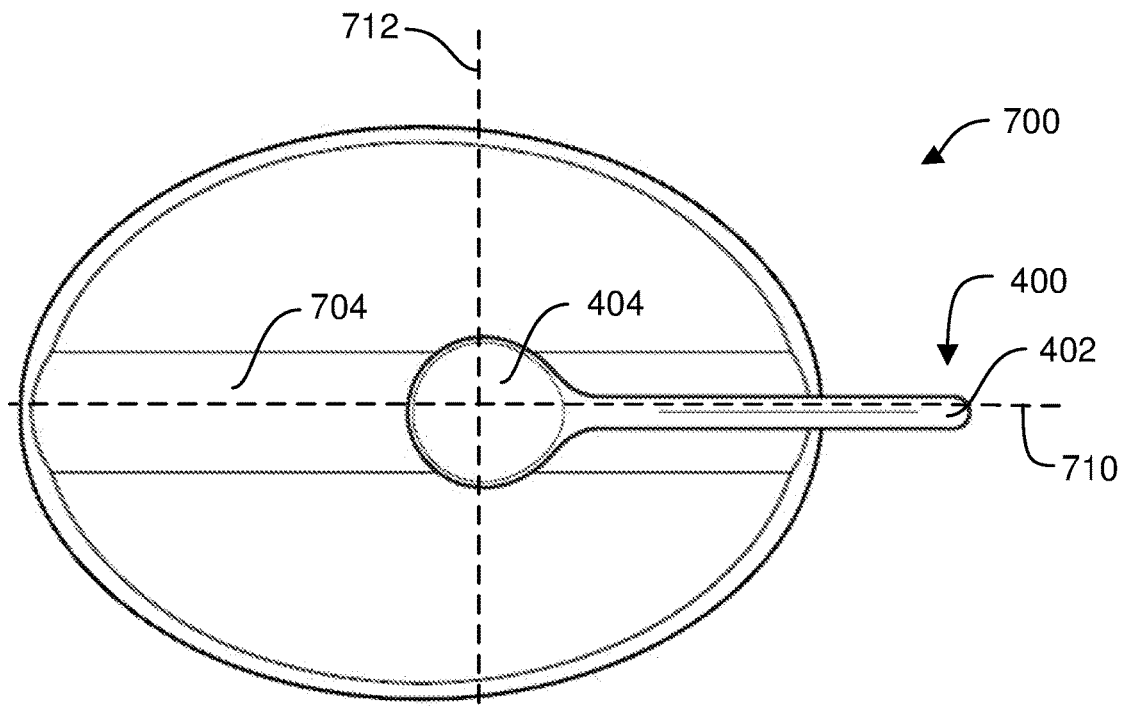

FIGS. 19-21 illustrates an oval-shaped container 700 that can be used with a circular spoon 400 like that shown in FIG. 10. Container 700 has a greater length along a major axis 710 and a shorter length across a minor axis 712. Apart from having an interior volume of a different shape from the containers illustrated in FIG. 1-18, the general features and operation of the oval-shaped containers and container systems are the same. A channel 704 is provided that extends across the bottom of the interior volume providing improved access to materials contained within the bowl. Although this embodiment is illustrated with the spoon of the embodiment shown in FIG. 10, it should be understood that different shaped spoons can be used with this system.

The location of channels in containers can vary depending on the shape of the container and the location where greater access to materials within the container is needed or desired. For example, FIG. 20 illustrates the channel 704 extending across the minor axis 712 of the container, while FIG. 21 illustrates an alternative embodiment in which the channel 704 extends across the major axis 710.

Figure 22:
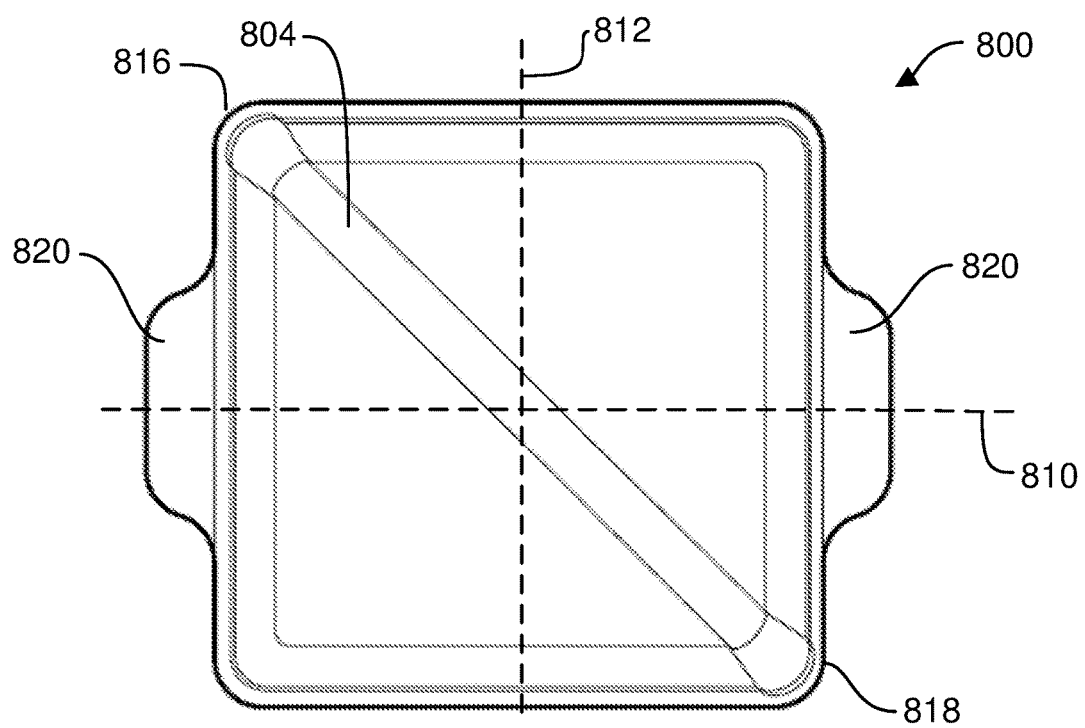
FIG. 22 illustrates a square container.
Figure 23:
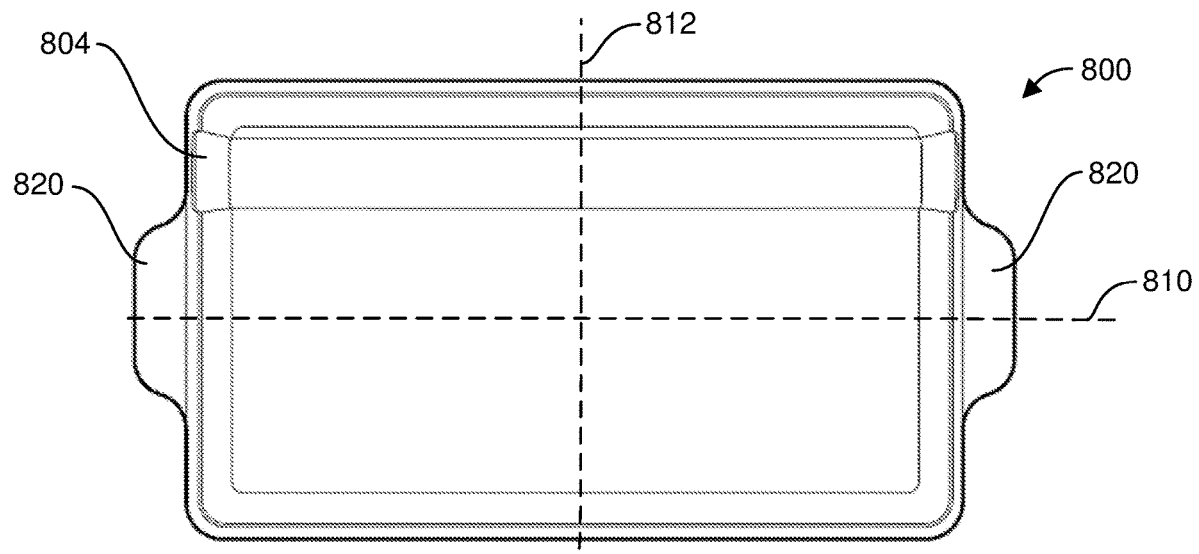
FIGS. 23-26 illustrate rectangular containers that are oblong.

FIGS. 22-26 illustrates rectangular-shaped containers 800. The rectangular container 800 can be square or it can have a greater length along a major axis than along the minor axis. For example, FIG. 22 illustrates a square container 800, while FIGS. 23-26 are oblong. Thus, the length of the container along axis 810 and the length of the container along axis 812 in FIG. 22 are generally the same. In contrast, however, the length of the container along (major) axis 810 and the length of the container along (minor) axis 812 in FIGS. 23-26 are different. The amount of difference can vary. For example, the length along the major axis can be only slightly longer than the length along the minor axis, the length along the major axis can be significantly longer than the length along the minor axis (e.g., 2 or more times longer), or anywhere in between.

As in other embodiments, the location of the channel(s) can vary. Thus, for example, in FIG. 22, the channel 804 extends from one corner 816 of the rectangular container 800 to another, opposing corner 818. Alternatively, the channel 804 can extend from one side to another, such as along the major axis (FIG. 23) or along the minor axis (FIGS. 25-26).

Figure 24:
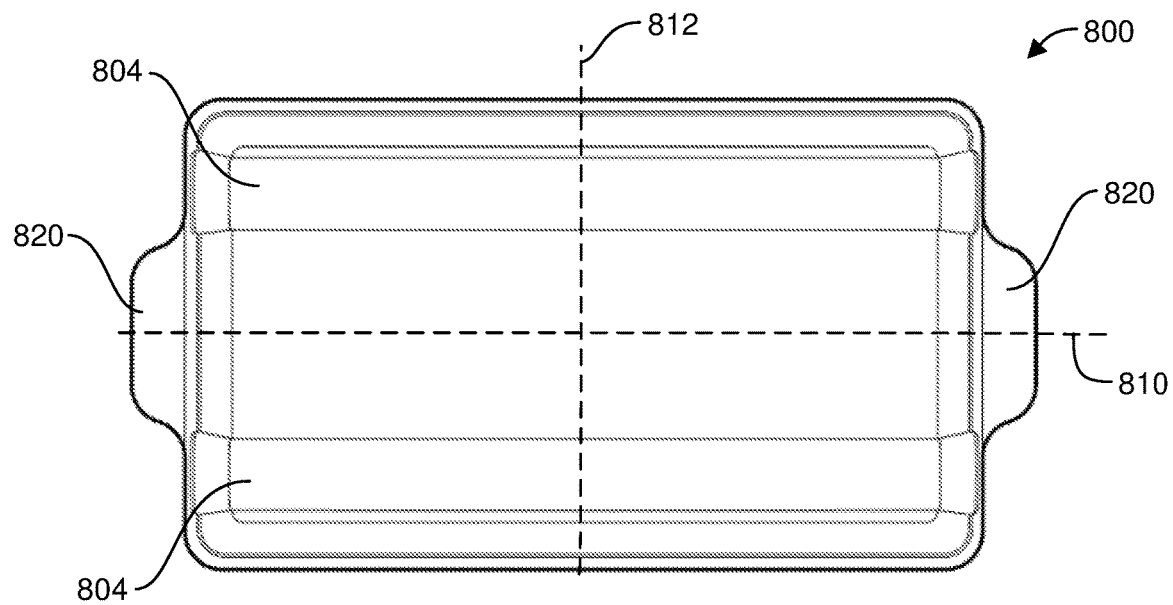

FIG. 24 illustrates another embodiment where more than one channel 804 are provided. In this example, the two channels are illustrated as being parallel channels that both extend along the major axis 810.

Figure 25:
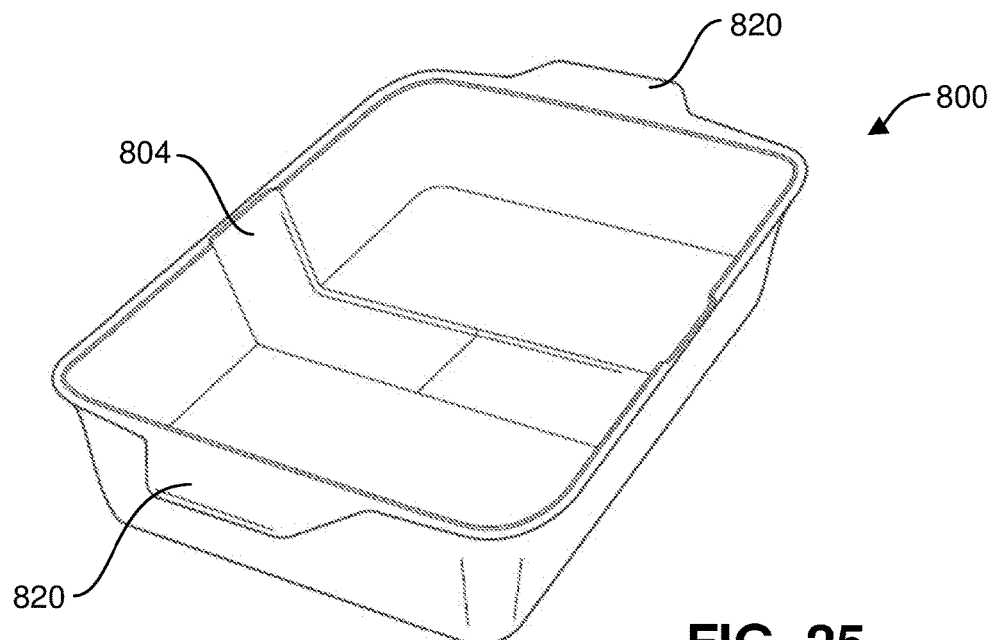
Figure 26:
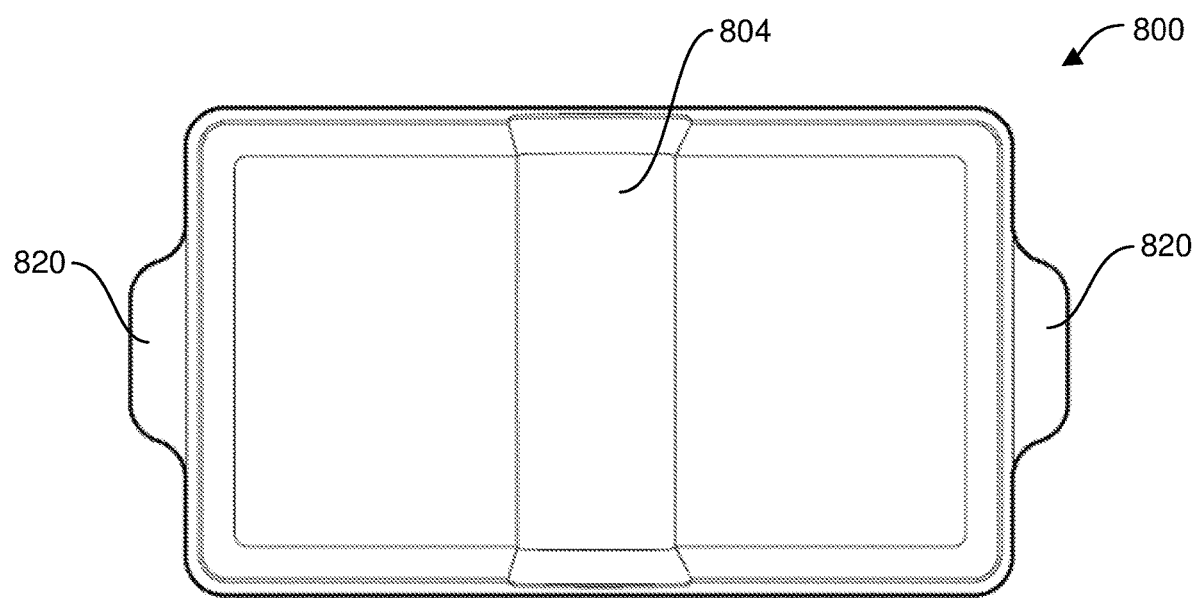

FIGS. 25 and 26 illustrate a channel 804 that is centered relative to the major axis of the container 800. Of course, other locations of the channel are possible, such as locations off-center relative to the major axis or at an angle to the major axis, such as the arrangement shown in FIG. 22.

In some embodiments, one or more handles 820 can be provided to allow for easier handling of the container 800. This can facilitate carrying the container and/or lifting the container for pouring the material from the container through the channel(s).

For larger containers, such as containers that are large enough to serve portions of food to a plurality of people (e.g., casserole dishes and the like), providing one or more channels can permit greater access to liquids that accumulate at the bottom of the container, but which may be desirable to gain access to without first removing the entire contents of the container. In addition, the channel(s) also can provide "drainage" access, to the extent that it may be desirable to remove excess liquid from a container before serving.

Figure 27:
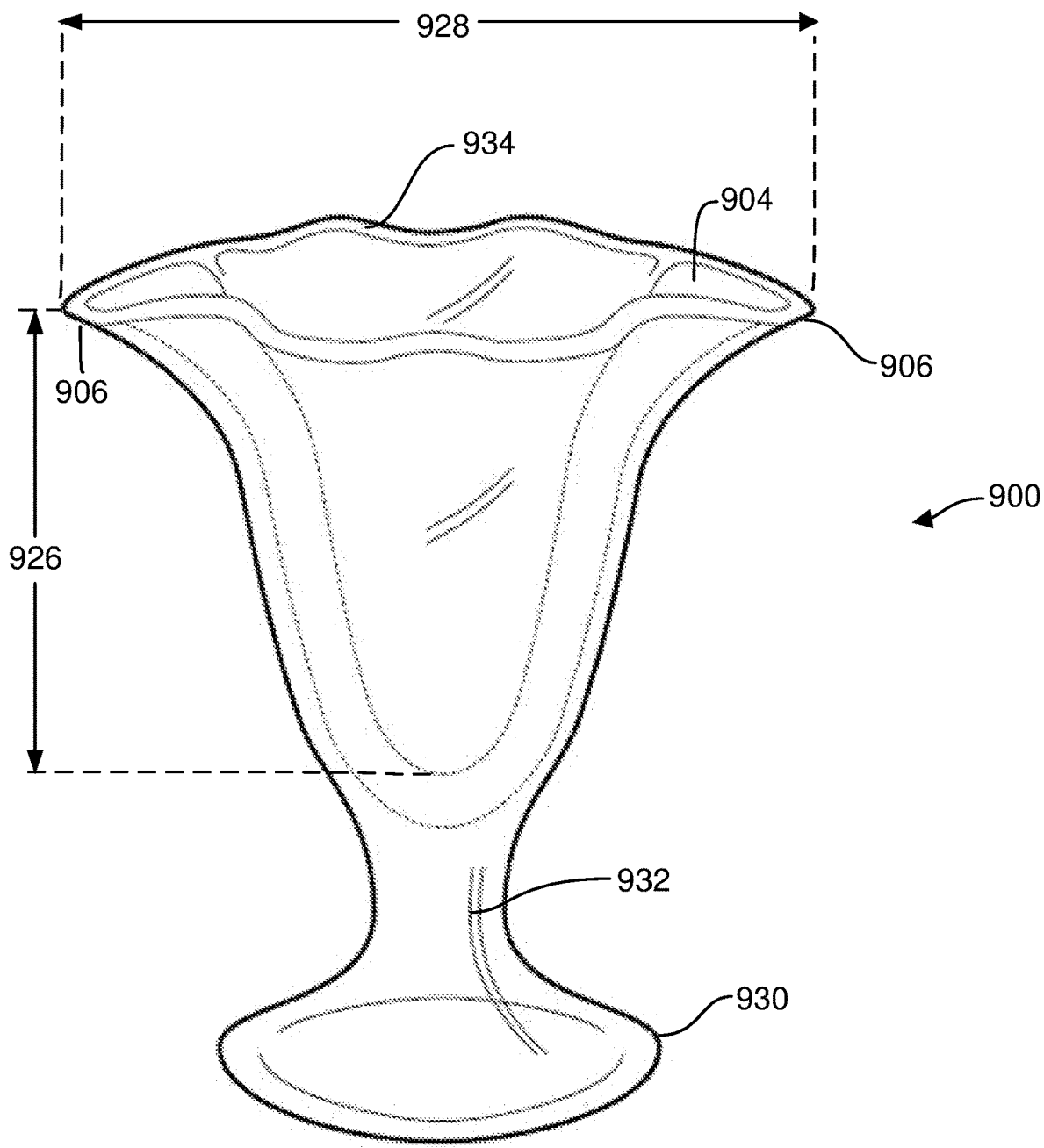
FIG. 27 illustrates a container with a channel that has a deeper dimension relative to a width of its opening.

FIG. 27 illustrates another embodiment of a container 900 that utilizing a channel 904. Container 900 has a deeper dimension relative to a width of its opening. For example, a depth 926 of the container can be greater than a width 928 of the opening of the container 904. This structure can be, for example, a container that is shaped as a conventional ice cream sundae container. The container 900 can have a base 930 and a stem 932, which spaces the base 930 from the bottom of the area that contains food. One or more spouts 906 can be provided for improved pouring of liquid or foodstuffs from the container. As used herein, the term "spout" refers to a shape that extends from an adjacent area or edge (such as a perimeter of an opening of a container) and that is in fluid connection with one or more channels in the container, providing a greater ability to control the flow of fluids out of the opening of the container.

Figure 28:
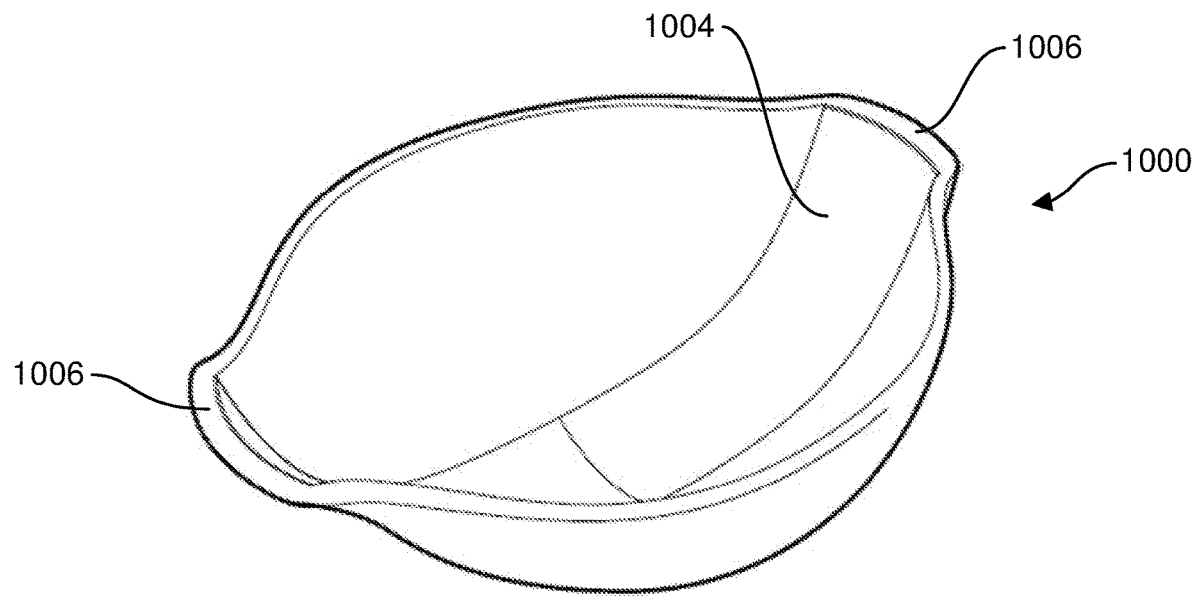
FIG. 28 illustrates a container that includes an oval shaped bowl with a pair of spouts.
Figure 29:
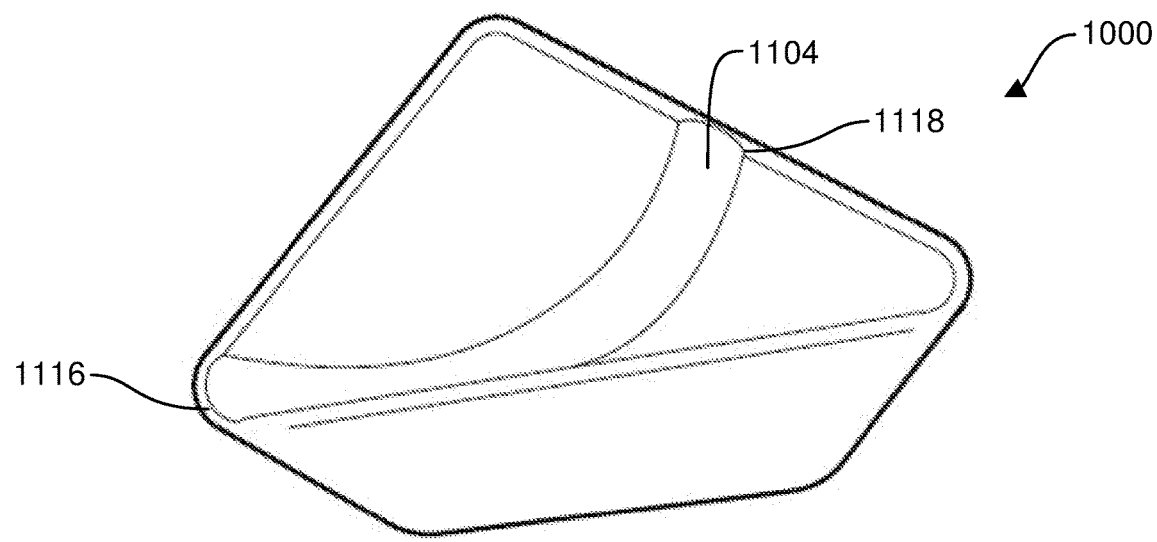
FIG. 29 illustrates a triangular-shaped bowl with a channel.
Figure 30:
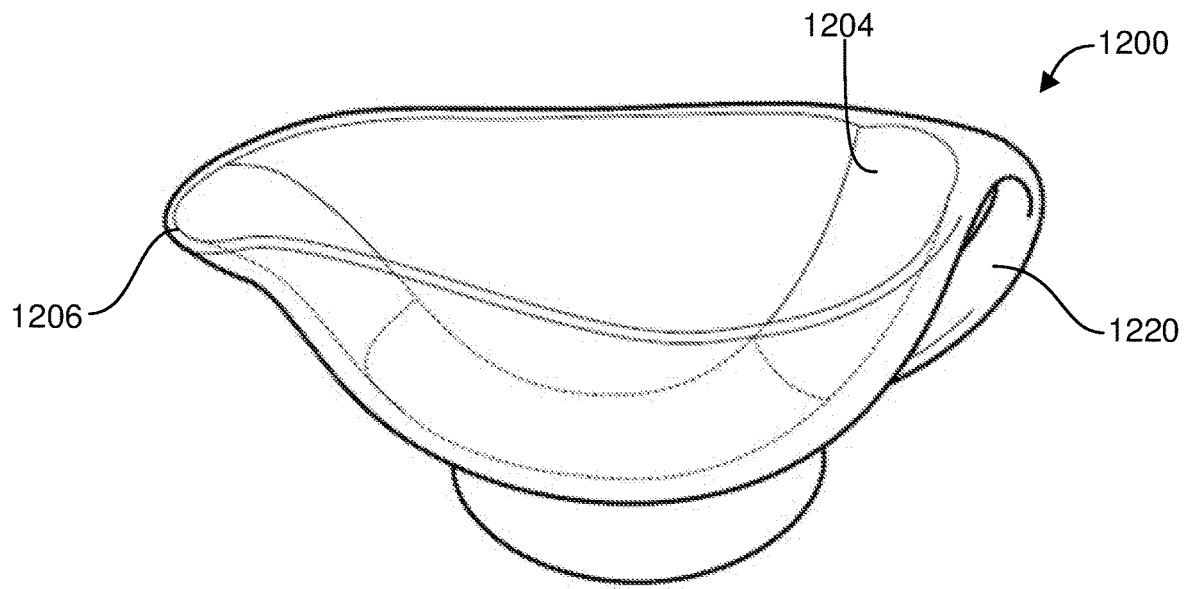
FIGS. 30-31 illustrate a container that include a single spout and an opposing handle that facilitates pouring of material in the container out of the spout via a channel.
Figure 31:
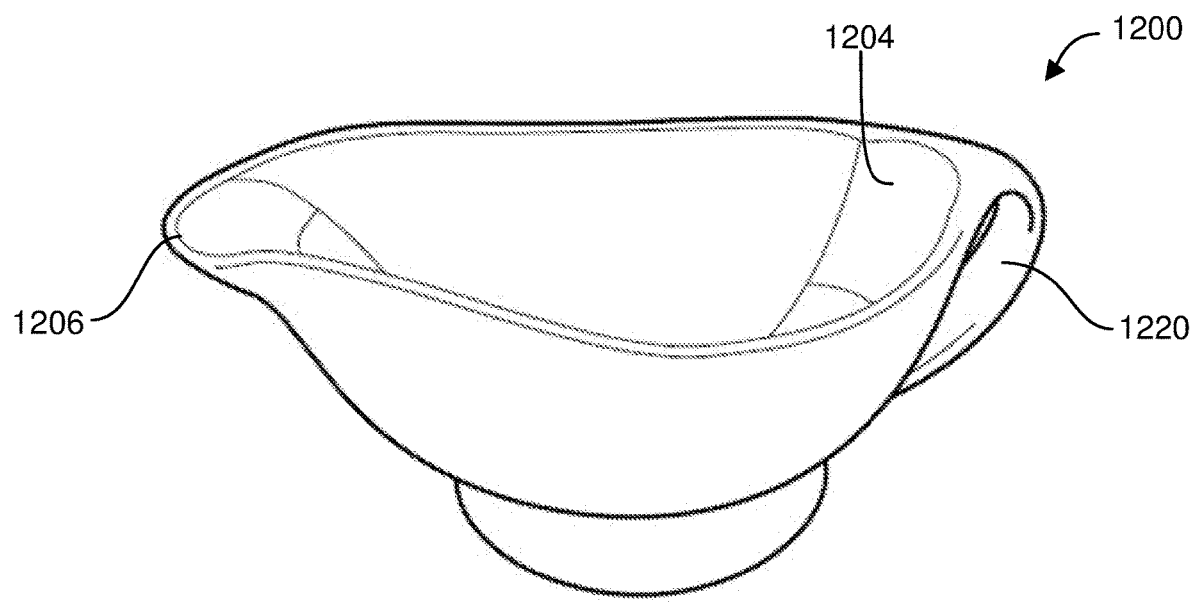

FIGS. 28-32 illustrate additional embodiments that provide similar channels, but with different shapes. For example, FIG. 28 illustrates a container 1000 that includes an oval shaped bowl with a pair of spouts 1006, FIG. 29 illustrates a triangular-shaped bowl 1100, with a channel 1104 that extends from a corner area 1116 to an opposing side area 1118, and FIGS. 30-31 illustrate a container 1200 that include a single spout 1206 and an opposing handle 1220 that facilitates pouring of material in the container out of the spout 1206 via a channel 1204.

Figure 32:
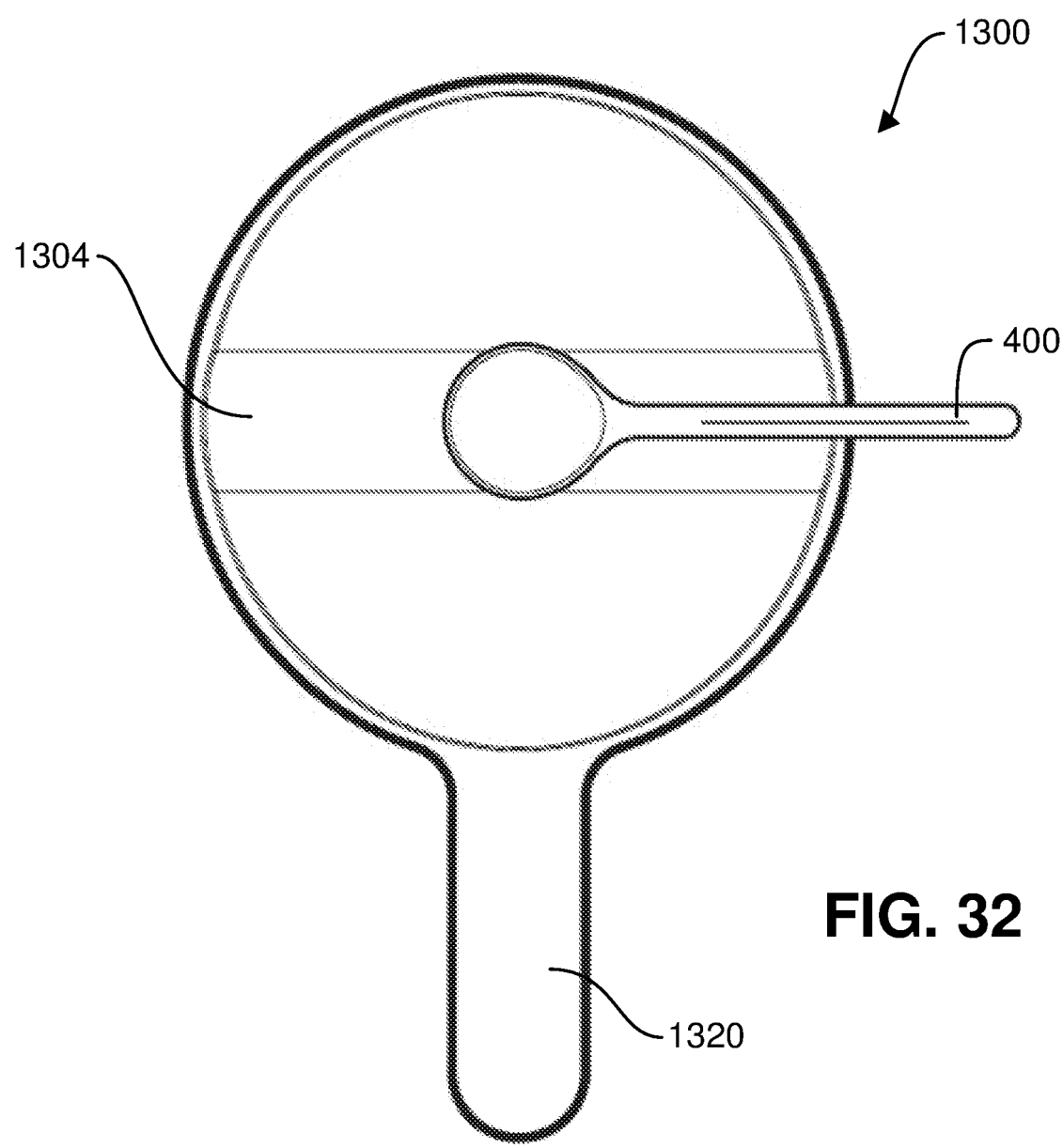
FIG. 32 illustrates a container that includes a channel and a handle that extends outward from the container at an angle to the channel.

Referring to FIG. 32, another container 1300 is shown. Container 1300 includes a channel 1304 that extends across the circular container and a handle 1320 that extends outward from the container 1300 at an angle to the channel. In particular, the angle between the channel and handle can be between 45 and 135 degrees, and more preferably about 90 degrees, to facilitate drinking from the container while holding the handle and/or pouring material from the container while holding the handle.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms may be high-level descriptions of the actual operations that are performed. The actual operations that correspond to these terms may vary depending on the particular implementation.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are only preferred examples of the disclosed technology and should not be taken as limiting the scope of the disclosed technology. Rather, the scope of the disclosure is at least as broad as the following claims. I therefore claim all that comes within the scope of these claims.

I claim:

1. A container comprising:
 a concave main body comprising an internal volume and an opening to the internal volume, the main body comprising a top edge that extends along a perimeter of the opening; and
 a recessed channel that extends along an interior surface of the main body,
 wherein the recessed channel extends continuously from the top edge at one side of the main body, through a bottom surface of the main body to the top edge at an opposite side of the main body,
 wherein the recessed channel extends through the top edge at the one side of the main body and through the top edge at the opposite side of the main body.

2. The container of claim 1, wherein a width of the channel is less than one third of a width of the main body.

3. The container of claim 1, wherein a width of the channel is less than one fourth of a width of the main body.

4. The container of claim 1, wherein a width of the channel is between one sixth and one fourth of a width of the main body.

5. The container of claim 1, wherein an outer surface of the main body comprises a plurality of contiguous sections extending circumferentially around the main body.

6. The container of claim 5, wherein at least one of the sections has a dimpled surface.

7. The container of claim 5, wherein at least one of the sections comprises at least two vertically adjacent polygonal portions.

8. The container of claim 7, wherein the at least two vertically adjacent polygonal portions comprise a first portion defining a first angle with respect to a central axis of the main body and a second portion positioned above the first portion and defining a second angle with respect to the central axis, wherein the first angle is greater than the second angle.

9. The container of claim 1, wherein a width of the channel is substantially equal to a width of a spoon head.

10. The container of claim 1, wherein a width of the channel is less than a width of a spoon head.

11. A system comprising:
 a container with an internal volume and an opening to the internal volume, the container comprising:
  a concave main body having a top edge that extends along a perimeter of the opening; and
  a recessed channel extending along an interior surface of the main body, extending from the top edge at one side of the main body, through a bottom surface of the main body, to the top edge at an opposite side of the main body; and
 a spoon comprising a handle and a spoon head,
 wherein the recessed channel extends through the top edge at the one side of the main body and through the top edge at the opposite side of the main body.

12. The system of claim 11, wherein a width of the spoon head is substantially equal to a width of the channel.

13. The system of claim 11, wherein a width of the spoon head is greater than a width of the channel.

14. The system of claim 11, wherein the spoon head has a substantially oval shape.

15. The system of claim 11, wherein the spoon head has a substantially circular shape.

16. The system of claim 11, wherein the handle of the spoon has an arched shape.

17. The system of claim 11, wherein the spoon head has a curved front lip.

18. The system of claim 11, wherein the spoon head has a concave shape.

19. The system of claim 11, wherein a depth of the channel corresponds to a depth of the spoon head.

20. The system of claim 11, wherein a depth of the channel is between 0.3 inches and 1.5 inches.

* * * * *